(12) United States Patent
Yashiro

(10) Patent No.: US 11,982,915 B1
(45) Date of Patent: May 14, 2024

(54) ELECTRO-OPTICAL DEVICE AND ELECTRONIC APPARATUS

(71) Applicant: SEIKO EPSON CORPORATION, Tokyo (JP)

(72) Inventor: Yuki Yashiro, Chitose (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 18/494,753

(22) Filed: Oct. 25, 2023

(30) Foreign Application Priority Data

Oct. 27, 2022 (JP) ................................ 2022-172118

(51) Int. Cl.
| | | |
|---|---|---|
| *G02F 1/1343* | (2006.01) | |
| *G02F 1/1333* | (2006.01) | |
| *G02F 1/1335* | (2006.01) | |
| *G02F 1/1362* | (2006.01) | |
| *G02F 1/1368* | (2006.01) | |
| *G03B 21/00* | (2006.01) | |

(52) U.S. Cl.
CPC ...... *G02F 1/1368* (2013.01); *G02F 1/134309* (2013.01); *G02F 1/13629* (2021.01); *G03B 21/006* (2013.01); *G02F 1/133345* (2013.01); *G02F 1/133526* (2013.01); *G02F 1/136227* (2013.01)

(58) Field of Classification Search
CPC ............. G02F 1/1333; G02F 1/133345; G02F 1/133357; G02F 1/1335; G02F 1/133526; G02F 1/1343; G02F 1/134309; G02F 1/1362; G02F 1/136209; G02F 1/136227; G02F 1/13629; G02F 1/1368; G03B 21/006

See application file for complete search history.

(56) References Cited

U.S. PATENT DOCUMENTS

| | | |
|---|---|---|
| 2019/0064584 A1 | 2/2019 | Ito |
| 2021/0103184 A1 | 4/2021 | Izawa |
| 2021/0286225 A1 | 9/2021 | Izawa |

FOREIGN PATENT DOCUMENTS

| | | |
|---|---|---|
| JP | 2019139252 | 8/2019 |
| JP | 2021060516 | 4/2021 |
| JP | 2021148813 | 9/2021 |
| JP | 2021167884 | 10/2021 |

*Primary Examiner* — Thoi V Duong
(74) *Attorney, Agent, or Firm* — JCIPRNET

(57) ABSTRACT

Included are a transistor, a pixel electrode provided corresponding to the transistor, a lens layer provided at a layer between the transistor and the pixel electrode, a light transmitting layer provided at a layer between the lens layer and the pixel electrode, and planarized together with the lens layer, a relay layer provided at a layer between the transistor and the lens layer, and another relay layer provided at a layer between the light transmitting layer and the pixel electrode, and electrically connected to the relay layer via a contact hole.

14 Claims, 24 Drawing Sheets

ELECTRO-OPTICAL DEVICE AND ELECTRONIC APPARATUS

The present application is based on, and claims priority from JP Application Serial Number 2022-172118, filed Oct. 27, 2022, the disclosure of which is hereby incorporated by reference herein in its entirety.

BACKGROUND

1. Technical Field

The present disclosure relates to an electro-optical device and an electronic apparatus including an electro-optical device.

2. Related Art

JP 2021-167884 A describes an electro-optical device including a pixel electrode formed at a substrate body of an element substrate, a transistor formed between the pixel electrode and a substrate, a lens formed between the pixel electrode and the transistor, and a conductive portion provided to extend through a layer at which the lens is provided, and electrically connected to the pixel electrode.

Since a thickness of the layer at which the lens is provided between the pixel electrode and the transistor is large, it is necessary to provide a contact hole having a high aspect ratio in order to provide the conductive portion extending through the layer at which the lens is provided. However, there was a problem that it was difficult to form a contact hole having a high aspect ratio.

SUMMARY

An electro-optical device according to an aspect of the present application includes a transistor, a pixel electrode provided corresponding to the transistor, a lens layer provided at a layer between the transistor and the pixel electrode, a first light transmitting layer provided at a layer between the lens layer and the pixel electrode, and planarized together with the lens layer, a first conductive layer provided at a layer between the transistor and the lens layer, and a second conductive layer provided at a layer between the first light transmitting layer and the pixel electrode, and electrically connected to the first conductive layer via a first contact hole.

An electro-optical device according to an aspect of the present application includes a transistor, a pixel electrode provided corresponding to the transistor, a lens layer provided at a layer between the transistor and the pixel electrode, a first light transmitting layer provided at a layer between the lens layer and the pixel electrode, and provided between adjacent lens curved surfaces of the lens layer in plan view, a first conductive layer provided at a layer between the transistor and the lens layer, and a second conductive layer provided at a layer between the first light transmitting layer and the pixel electrode, and electrically connected to the first conductive layer via a first contact hole.

An electronic apparatus according to an aspect of the present disclosure includes the electro-optical device described above.

A method of manufacturing an electro-optical device according to an aspect of the present application includes forming a first conductive layer, forming a lens layer including a lens surface at the first conductive layer, stacking a first light transmitting layer at the lens layer, polishing or etching the first light transmitting layer until a part of the lens surface of the lens layer is exposed, forming a first contact hole by etching the first light transmitting layer and the lens layer, and forming a second conductive layer at a position overlapping the first contact hole.

DESCRIPTION OF EMBODIMENTS

Embodiments of the present disclosure will be described below with reference to the accompanying drawings.

In the following drawings, the dimensions of some components may be scaled differently for ease of understanding for the components.

Further, hereinafter, for convenience of explanation, the description will be made appropriately using an X-axis, a Y-axis and a Z-axis orthogonal to each other. Also, one direction along the X-axis is referred to as an X1 direction, and a direction opposite to the X1 direction is referred to as an X2 direction. Similarly, one direction along the Y-axis is referred to as a Y1 direction, and a direction opposite to the Y1 direction is referred to as a Y2 direction. One direction along the Z-axis is referred to as a Z1 direction, and a direction opposite to the Z1 direction is referred to as a Z2 direction. Further, in the following description, viewing in the Z1 direction or the Z2 direction is referred to as "plan view", and viewing in a direction perpendicular to a cross-section including the Z-axis is referred to as "cross-sectional view".

Further, in the following description, for example, with respect to a substrate, the description "on the substrate" means any of a case in which the element is disposed on the substrate in contact therewith, a case in which the element is disposed on the substrate with another structure interposed therebetween, and a case in which the element is partially disposed on the substrate in contact therewith and partially disposed with another structure interposed therebetween. In addition, the description of an upper surface of a certain configuration indicates a surface of the configuration on the side on the Z1 direction side, for example, an "upper surface of a light transmitting layer" indicates a surface of the light transmitting layer on the side on the Z1 direction side. In addition, the description of a lower surface of a certain configuration indicates a surface of the configuration on the side in the Z2 direction, for example, a "lower surface of a contact plug" indicates a surface of the contact plug on the side in the Z2 direction.

1. Embodiment 1

In the embodiment, as an electro-optical device, an active drive liquid crystal device having a thin film transistor (TFT) being a switching element for each of pixels will be described as an example. The liquid crystal device is used, for example, as a light modulation device in a projection type display device as an electronic apparatus which will be described below.

1.1. Outline of Structure of Liquid Crystal Device

Figure 1:
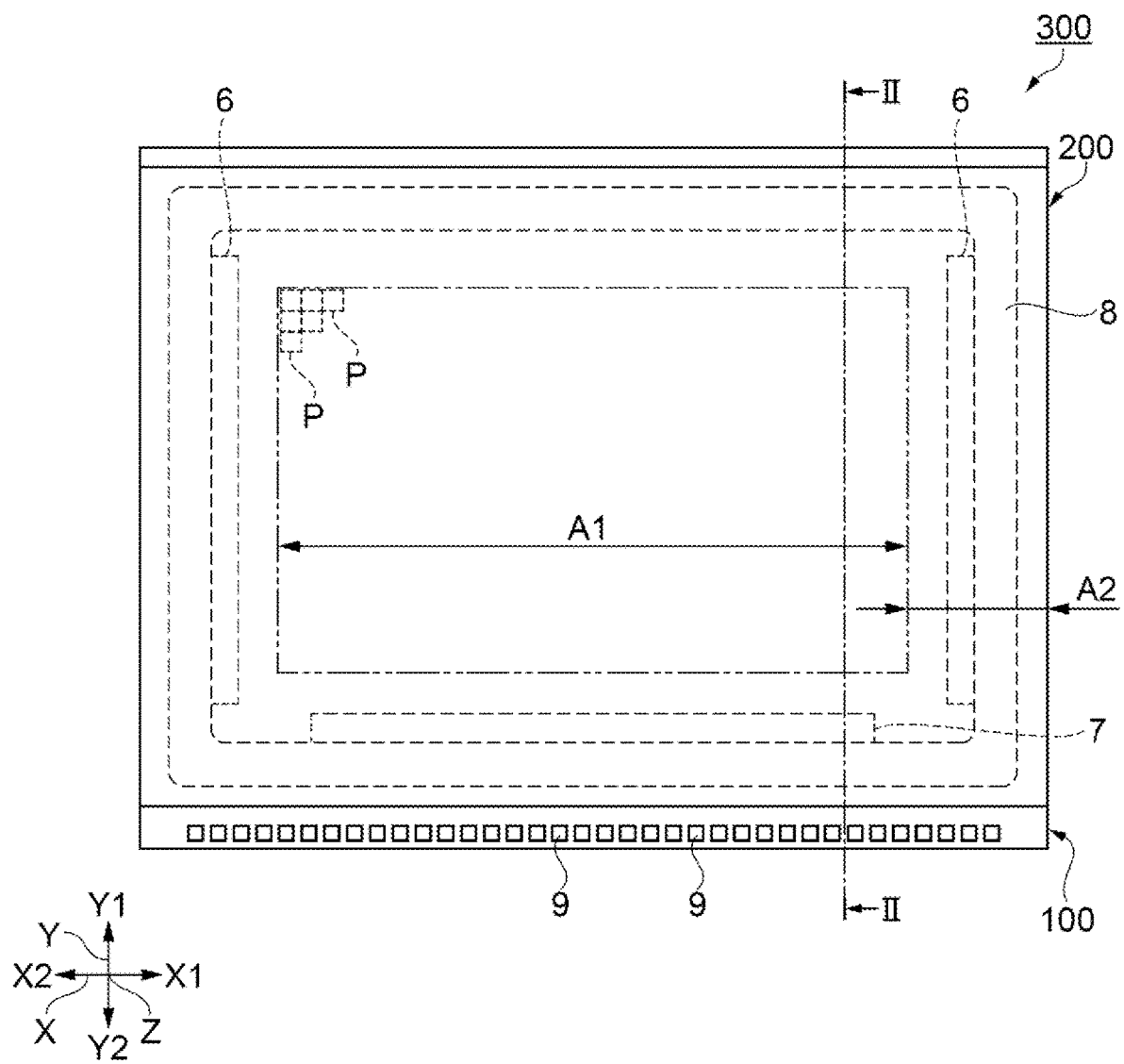
FIG. 1 is a plan view of an electro-optical device according to Embodiment 1.
Figure 2:
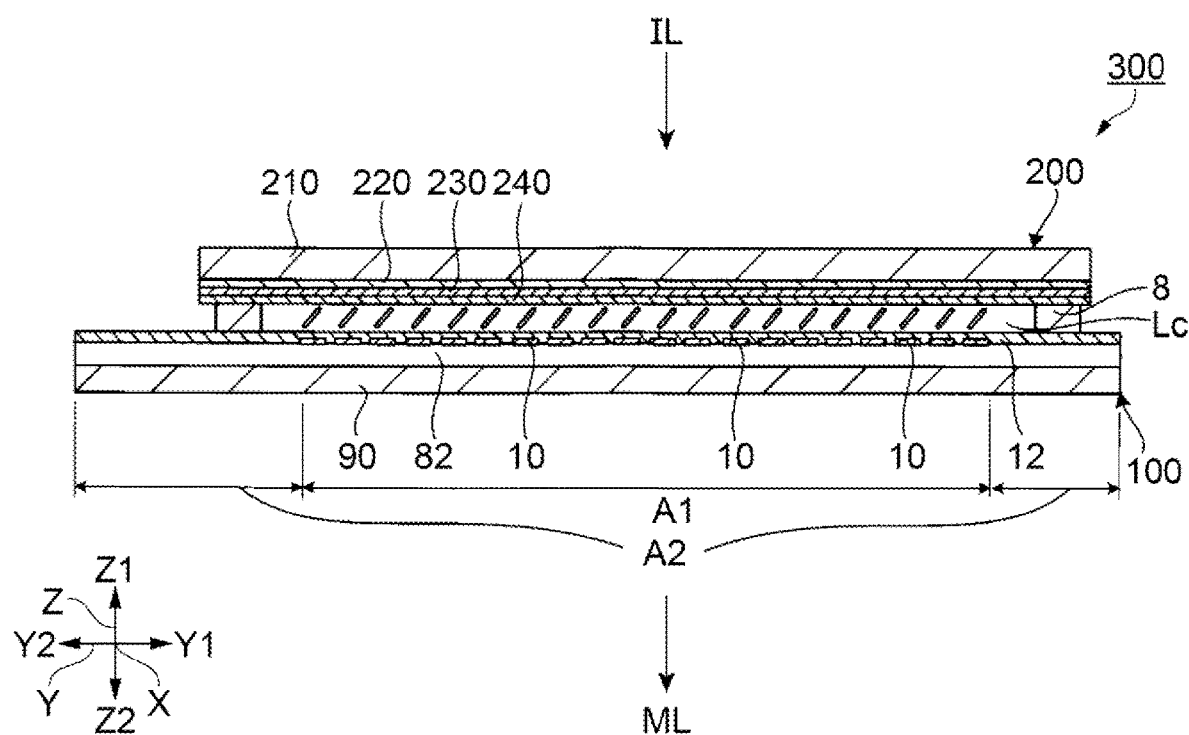
FIG. 2 is a cross-sectional view of the electro-optical device taken along line II-II in FIG. 1.

A structure of a liquid crystal device as an electro-optical device according to the embodiment will be described with reference to FIGS. 1 and 2. FIG. 1 is a plan view of an electro-optical device according to Embodiment 1, and illustrates a schematic plan configuration of a transmissive liquid crystal device 300 as the electro-optical device. FIG. 2 is a cross-sectional view of the electro-optical device taken along line II-II in FIG. 1, and illustrates a schematic cross-sectional configuration of the liquid crystal device 300.

As illustrated in FIGS. 1 and 2, the liquid crystal device 300 includes an element substrate 100 having a light transmitting property, a counter substrate 200 having a light transmitting property, a sealing member 8 provided in a frame shape, and a liquid crystal layer Lc. The term "light transmitting property" refers to transparency to visible light, and means that a transmittance of visible light may be 50% or more.

The liquid crystal device 300 includes a display region A1 for displaying an image and an outer region A2 located outside the display region A1 in plan view. A plurality of pixels P arranged in a matrix pattern are provided in the display region A1. Although a shape of the liquid crystal device 300 illustrated in FIG. 1 is quadrangular, it may be circular, for example.

As illustrated in FIG. 2, the element substrate 100 and the counter substrate 200 are disposed with the liquid crystal layer Lc interposed therebetween.

In the embodiment, the counter substrate 200 is disposed on a light incident side of the liquid crystal layer Lc, and the element substrate 100 is disposed on a light emitting side of the liquid crystal layer Lc. Incident light IL incident on the counter substrate 200 is modulated by the liquid crystal layer Lc and is emitted from the element substrate 100 as modulated light ML.

The element substrate 100 includes a base body 90, a plurality of interlayer insulating layers including an interlayer insulating layer 82, a pixel electrode 10, and an alignment film 12. Although not illustrated, a lens layer 34 which will be described below is provided between the pixel electrode 10 and the interlayer insulating layer 82.

The base body 90 is a flat plate having a light transmitting property and an insulation property. The base body 90 is, for example, a glass substrate or a quartz substrate. The transistor 1 which will be described below is disposed between the plurality of interlayer insulating layers.

The pixel electrode 10 has a light transmitting property. The pixel electrode 10 is formed of a transparent conductive material such as indium tin oxide (ITO), indium zinc oxide (IZO) and fluorine-doped tin oxide (FTO). A thickness-wise direction of the pixel electrode 10 coincides with the Z1 direction or the Z2 direction.

The alignment film 12 has a light transmitting property and an insulation property. The alignment film 12 aligns liquid crystal molecules of the liquid crystal layer Lc. Examples of a material of the alignment film 12 include silicon oxide ($SiO_2$) and polyimide.

The counter substrate 200 is a substrate disposed to face the element substrate 100. The counter substrate 200 includes a base body 210, an insulating layer 220, a common electrode 230 and an alignment film 240.

The base body 210 is a flat plate having a light transmitting property and an insulation property. The base body 210 is, for example, a glass substrate or a quartz substrate.

The insulating layer 220 has a light transmitting property and an insulating property. A material of the insulating layer 220 is an inorganic material such as silicon oxide.

The common electrode 230 is an electrode disposed to face a plurality of the pixel electrodes 10, and is also referred to as a counter electrode. The common electrode 230 includes a transparent conductive material such as ITO, IZO and FTO. The common electrode 230 and the pixel electrode 10 apply an electric field to the liquid crystal layer Lc.

The alignment film 240 has a light transmitting property and an insulating property.

The sealing member 8 is disposed between the element substrate 100 and the counter substrate 200. The sealing member 8 is formed using an adhesive containing various types of curable resins such as epoxy resin, for example. The sealing member 8 may include a gap material made of an inorganic material such as glass.

The liquid crystal layer Lc is disposed in a region surrounded by the element substrate 100, the counter substrate 200 and the sealing member 8. The liquid crystal layer Lc is an electro-optical layer of which optical characteristics change in accordance with an electric field caused by the pixel electrode 10 and the common electrode 230. The liquid crystal layer Lc contains liquid crystal molecules having positive or negative dielectric anisotropy. The alignment of the liquid crystal molecules changes according to an electric field applied to the liquid crystal layer Lc. The liquid crystal layer Lc modulates the incident light IL in accordance with the applied electric field.

As illustrated in FIG. 1, a plurality of scanning line driving circuits 6, a data line driving circuit 7 and a plurality of external terminals 9 are disposed in the outer region A2 of the element substrate 100. Some of the plurality of external terminals 9 are connected to the scanning line driving circuit 6 or the data line driving circuit 7 via wiring (not illustrated). Further, the plurality of external terminals 9 include a terminal to which a common potential is applied from the outside.

1.2. Electrical Configuration of Element Substrate

Figure 3:
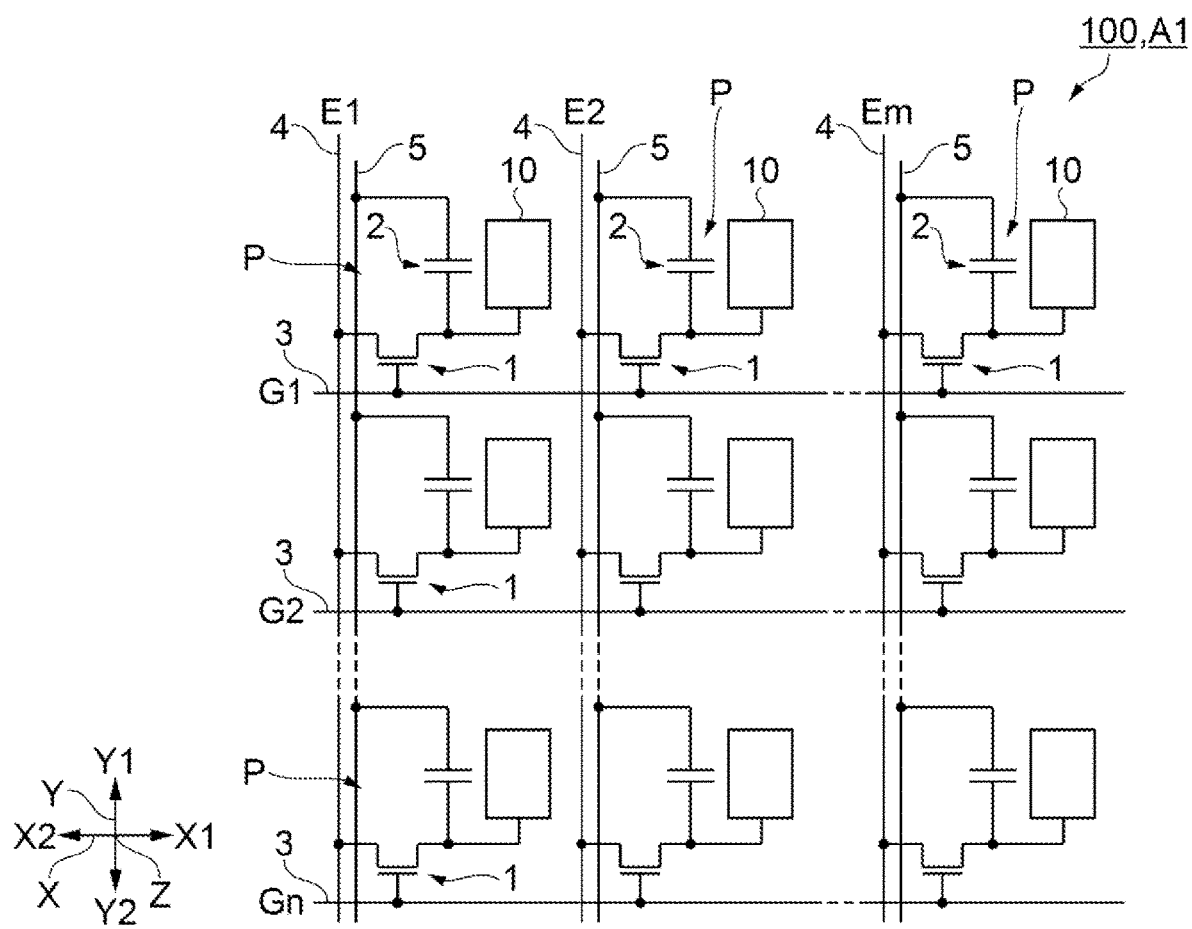
FIG. 3 is an equivalent circuit diagram illustrating an electrical configuration of an element substrate.

FIG. 3 is an equivalent circuit diagram illustrating an electrical configuration of the element substrate.

As illustrated in FIG. 3, a plurality of transistors 1 as switching elements, n scanning lines 3, m data lines 4, and m capacitance lines 5 are provided in the display region A1 of the element substrate 100. Both n and m are integers of 2 or greater. The transistors 1 are disposed corresponding to intersections of the n scanning lines 3 and the m data lines 4, respectively.

Each of the n scanning lines 3 extends in the X1 direction, and the n scanning lines 3 are arranged at equal intervals in the Y1 direction. Each of the n scanning lines 3 is electrically connected to a gate electrode of the corresponding transistor 1. The n scanning lines 3 are electrically connected to the scanning line driving circuit 6 illustrated in FIG. 1.

The scanning line driving circuit 6 line-sequentially supplies scanning signals G1, G2, . . . , and Gn to 1st to n-th scanning lines 3.

Each of the m data lines 4 extends in the Y1 direction, and the m data lines 4 are arranged at equal intervals in the X1 direction. The m data lines 4 are electrically connected to source regions of the corresponding plurality of transistor 1, respectively. The m data lines 4 are electrically connected to the data line driving circuit 7 illustrated in FIG. 1.

The data line driving circuit 7 supplies image signals E1, E2, . . . , and Em to 1st to m-th data lines 4.

The n scanning lines 3 and the m data lines 4 are electrically insulated from each other and are disposed in a lattice-like pattern in plan view. A region surrounded by two adjacent scanning lines 3 and two adjacent data lines 4 corresponds to a pixel P.

The pixel electrode 10 is provided for each of the pixels P. The pixel electrode 10 is electrically connected to a drain of the transistor 1.

Each of the m capacitance lines 5 extends in the Y1 direction, and the m capacitance lines 5 are arranged at equal intervals in the X1 direction. In addition, the m capacitance lines 5 are electrically insulated from the m data lines 4 and the n scanning lines 3 and are disposed with gaps therebetween. A fixed potential such as a common potential or a ground potential is applied to each of the capacitance lines 5.

One electrode of a capacitance element 2 is electrically connected to the capacitance line 5. Another electrode of the capacitance element 2 is electrically connected to the pixel electrode 10 and holds a potential of an image signal supplied to the pixel electrode 10.

1.3. Cross-Sectional Structure of Display Region of Element Substrate

Figure 4:
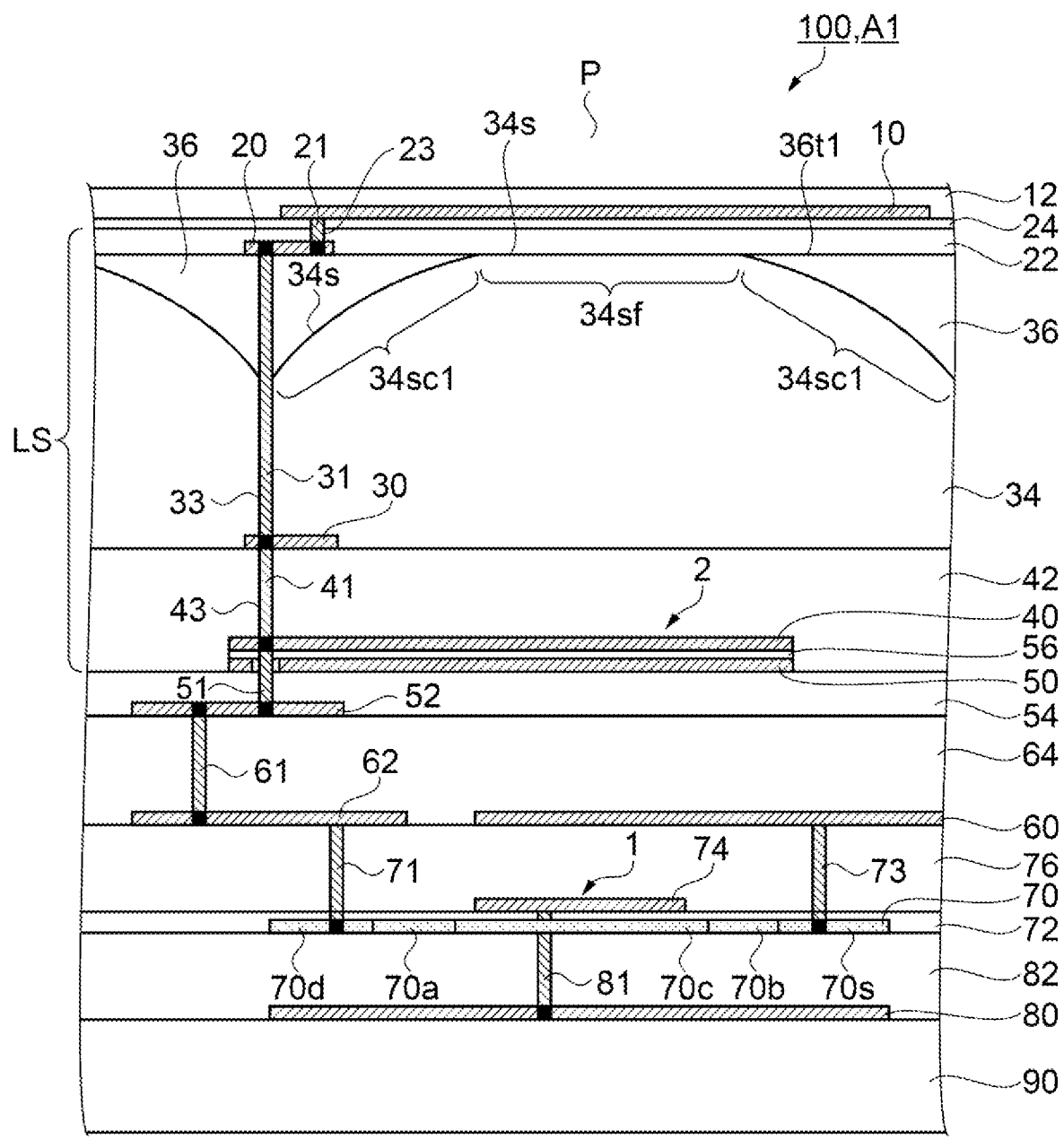
FIG. 4 is an explanatory diagram illustrating a cross-sectional structure of a display region of the element substrate.

FIG. 4 is an explanatory diagram illustrating a cross-sectional structure of the display region of the element substrate, and illustrates a cross-sectional structure of the pixel P provided in the display region A1.

As illustrated in FIG. 4, in the display region A1, the element substrate 100 has a cross-sectional structure in which insulating or conductive functional layers or functional films are stacked at the base body 90.

A light shielding layer 80 is disposed between the base body 90 and the interlayer insulating layer 82.

The light shielding layer 80 is formed of a conductive material having a light shielding property. As the conductive material having a light shielding property, for example, a metal such as tungsten (W), titanium (Ti), chromium (Cr), iron (Fe), or aluminum (Al), a metal nitride or a metal silicide can be used. The light shielding layer 80 constitutes a part of the scanning line 3. The term "light shielding property" means a light shielding property against visible light, means that a transmittance of visible light may be less than 50%, and may be 10% or less.

The interlayer insulating layer 82 has a light transmitting property and an insulating property. The interlayer insulating layer 82 is formed of, for example, an inorganic material such as silicon oxide.

The transistor 1 is disposed at the interlayer insulating layer 82.

The transistor 1 includes a semiconductor layer 70 having a lightly doped drain (LDD) structure, a gate electrode 74, and a gate insulating layer 72.

The semiconductor layer 70 includes a drain region 70d, an LDD region 70a, a channel region 70c, an LDD region 70b and a source region 70s.

The channel region 70c is located between the source region 70s and the drain region 70d. The LDD region 70b is located between the channel region 70c and the source region 70s. The LDD region 70a is located between the channel region 70c and the drain region 70d.

The semiconductor layer 70 is made of, for example, polysilicon, and the regions other than the channel region 70c are doped with an impurity for increasing conductivity. An impurity concentration in the LDD region 70b and the LDD region 70a is lower than an impurity concentration in the source region 70s and the drain region 70d.

The gate electrode 74 is provided at the semiconductor layer 70 via the gate insulating layer 72. The gate electrode 74 overlaps the channel region 70c of the semiconductor layer 70.

The gate electrode 74 is formed by, for example, doping polysilicon with an impurity that increases conductivity. The gate electrode 74 may be formed using a conductive material such as a metal, a metal silicide or a metal compound.

The gate insulating layer 72 is made of, for example, a film of silicon oxide formed by a thermal oxidation method, a chemical vapor deposition (CVD) method or the like.

The gate electrode 74 and the light shielding layer 80 are electrically connected through a contact hole 81 passing through the gate insulating layer 72 and the interlayer insulating layer 82.

A conductive layer 60 and a relay layer 62 are provided at the transistor 1 via an interlayer insulating layer 76. The conductive layer 60 and the relay layer 62 are provided at the same layer and are formed of a light shielding conductive material. The interlayer insulating layer 76 is formed of the same material as that of the interlayer insulating layer 82.

The conductive layer 60 constitutes a part of the data line 4. The conductive layer 60 is electrically connected to the source region 70s of the semiconductor layer 70 via a contact hole 73 passing through the interlayer insulating layer 76.

The relay layer 62 is electrically connected to the drain region 70d of the semiconductor layer 70 via a contact hole 71 passing through the interlayer insulating layer 76.

An interlayer insulating layer 64 is provided at the conductive layer 60 and the relay layer 62, and a relay layer 52 is provided at the interlayer insulating layer 64. The relay layer 52 is formed of a light shielding conductive material. The interlayer insulating layer 64 is formed of the same material as that of the interlayer insulating layer 82.

The relay layer 52 is electrically connected to the relay layer 62 through a contact hole 61 passing through the interlayer insulating layer 64.

The capacitance element 2 is provided at the relay layer 52 via an interlayer insulating layer 54.

The capacitance element 2 includes a capacitance electrode 50 provided on the base body 90 side, a capacitance electrode 40 provided on the pixel electrode 10 side, and a dielectric layer 56 provided between the capacitance electrode 50 and the capacitance electrode 40. Both the capacitance electrode 40 and the capacitance electrode 50 are formed of a light shielding conductive material. The interlayer insulating layer 54 is formed of the same material as that of the interlayer insulating layer 82.

The capacitance electrode 50 constitutes a part of the capacitance line 5.

The capacitance electrode 40 is electrically connected to the relay layer 52 via a contact hole 51 passing through the interlayer insulating layer 54. Thus, the capacitance electrode 40 is electrically connected to the drain region 70d of the transistor 1.

An optical functional layer LS including the lens layer 34 is provided between the capacitance electrode 40 and the pixel electrode 10.

The optical functional layer LS is provided to curb light amount loss. Specifically, an optical path of transmitted light is adjusted so that the transmitted light that has passed through the pixel electrode 10 is prevented from colliding with a light shielding material layer such as the data line 4 or the capacitance line 5 and causing loss. The optical functional layer LS includes a light transmitting layer 42, the lens layer 34, a light transmitting layer 36, a light transmitting layer 22, and a protective layer 24.

The light transmitting layer 42 is an optical path length adjusting layer called a path layer for adjusting an optical path length. The light transmitting layer 42 is formed of an inorganic material such as silicon oxide. Further, an upper surface of the light transmitting layer 42 is planarized by chemical mechanical polishing (CMP) or the like.

The lens layer 34 includes a lens surface 34s protruding toward the pixel electrode 10.

The lens surface 34s includes a flat portion 34sf planarized by CMP or the like and a curved surface portion 34sc1 as a lens curved surface portion surrounding the flat portion 34sf.

The lens layer 34 is formed of an inorganic material having a refractive index higher than that of each light transmitting layer, for example, silicon oxynitride (SiON).

The lens layer 34 is thicker than each light transmitting layer, and in the embodiment, the lens layer 34 is formed to be about 6000 nm thick. The large thickness of the lens layer 34 functions as an optical path length adjustment layer.

The light transmitting layer 36 is provided at the curved surface portion 34sc1. The light transmitting layer 36 includes an upper surface 36t1 planarized together with the lens layer 34. Therefore, the upper surface 36t1 of the light transmitting layer 36 is included in the same plane as the flat portion 34sf of the lens layer 34.

The light transmitting layer 36 is formed of an inorganic material such as silicon oxide similar to the light transmitting layer 42.

The light transmitting layer 22 is provided at the flat portion 34sf of the lens layer 34, the upper surface 36t1 of the light transmitting layer 36 and the relay layer 20. The light transmitting layer 22 is formed of an inorganic material such as silicon oxide similar to the light transmitting layer 42.

A contact hole 23 is provided to electrically connect the pixel electrode 10 and a contact plug 31 as a connecting member. A contact hole 33 is provided at a gap among four adjacent pixel electrodes 10 as will be described later, thus the pixel electrode 10 and the contact plug 31 cannot be directly connected to each other.

Therefore, the pixel electrode 10 and the contact plug 31 are electrically connected to each other via the relay layer 20 and a pixel contact plug 21 provided inside the contact hole 23.

The relay layer 20 is provided at the light transmitting layer 36 and is provided so as to overlap the contact plug 31 and the pixel electrode 10 in plan view. The pixel contact plug 21 is provided so as to overlap the relay layer 20 and the pixel electrode 10 in plan view.

As described above, by providing the light transmitting layer 22 between the relay layer 20 and the pixel electrode 10, it is possible to provide the contact plug 31 at the gap among the four adjacent pixel electrodes 10, and it is possible to satisfy a constraint of layout.

The protective layer 24 is provided at the light transmitting layer 22. The protective layer 24 is made of, for example, an inorganic material having light transmitting property and hygroscopicity such as borosilicate glass (BSG). The pixel electrode 10 is provided at the protective layer 24. The alignment film 12 is provided at the pixel electrode 10.

The pixel electrode 10 and the capacitance electrode 40 are electrically connected to each other via the pixel contact plug 21, the relay layer 20, the contact plug 31, a relay layer 30 and a contact plug 41 as a connecting member. Thus, the pixel electrode 10 is electrically connected to the drain region 70d of the transistor 1.

The pixel contact plug 21 is provided inside the contact hole 23. The contact hole 23 is provided to extend through the protective layer 24 and the light transmitting layer 22. The pixel contact plug 21 is formed of a conductive material such as tungsten.

When tungsten is used as a material for the pixel contact plug 21, the relay layer 20 is formed of a material, for example, titanium nitride or the like, which provides good electrical conduction with tungsten.

The contact plug 31 is provided inside the contact hole 33. The contact hole 33 is provided to extend through the lens layer 34 and the light transmitting layer 36. The contact plug 31 is formed of a conductive material such as tungsten.

The relay layer 30 is provided between the light transmitting layer 36 and the light transmitting layer 42. When tungsten is used for a material for the contact plug 31, the relay layer 30 is formed of a material such as titanium nitride or the like that provides good electrical conduction with tungsten.

The contact plug 41 is provided inside a contact hole 43. The contact hole 43 is provided to extend through the light transmitting layer 42.

The contact plug 41 is formed of a conductive material such as tungsten. The contact plug 41 is in contact with the relay layer 30 and the capacitance electrode 40 to electrically connect the relay layer 30 to the capacitance electrode 40.

1.4. Planar Structure of Display Region of Element Substrate

Figure 5:
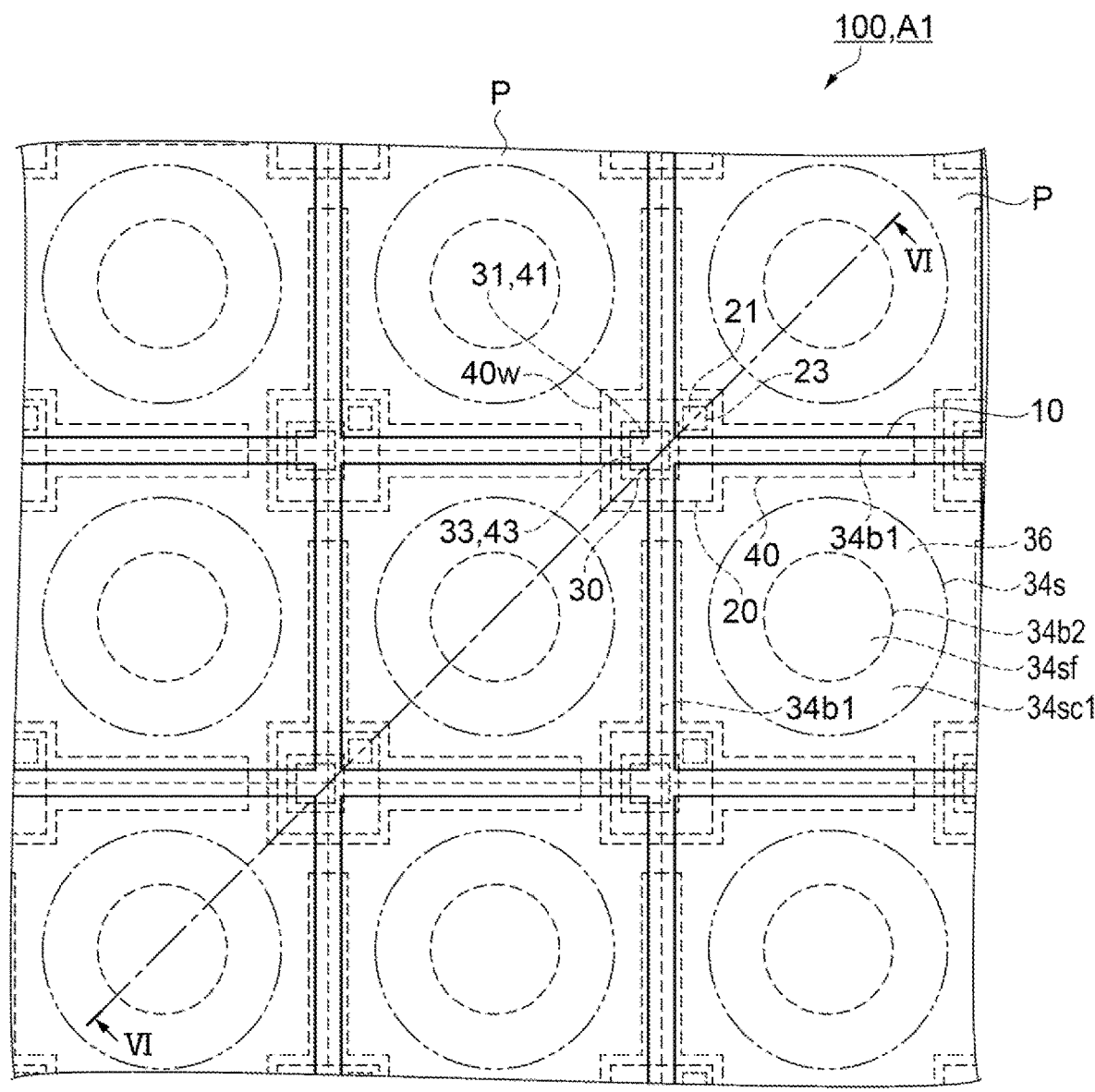
FIG. 5 is a plan view illustrating a part of the display region of the element substrate.

FIG. 5 is a plan view illustrating a part of the display region of the element substrate, and is a view of the display region A1 of the element substrate 100 when seen from the liquid crystal layer Lc side in the Z2 direction.

In FIG. 5, the pixel electrode 10 is drawn with a solid line, and a configuration included in the optical functional layer LS provided closer to the base body 90 than the pixel electrode 10 is drawn with a broken line. Additionally, the lens surface 34s of the curved surface portion 34sc1 of the lens layer 34 is indicated by a two dot chain line, and a boundary 34b1 at which the adjacent lens surfaces 34s are in contact with each other is indicated by a broken line.

Additionally, a boundary 34b2 between the flat portion 34sf and the curved surface portion 34sc1 of the lens layer 34 is indicated by a broken line. An inside of a region surrounded by the boundary 34b2 is the flat portion 34sf, and an outside of the boundary 34b2 is the curved surface portion 34sc1. In the embodiment, the light transmitting layer 36 overlaps the curved surface portion 34sc1 and does not overlap the flat portion 34sf.

The pixel electrodes 10 are disposed in a matrix along the X-axis and the Y-axis.

The pixel contact plug 21 is provided at a position overlapping the pixel electrode 10, in the embodiment, a position overlapping a lower left corner of the drawing of four corners of the pixel electrode 10.

A shape of the relay layer 20 is a rectangle. Four corners of the relay layer 20 are provided to overlap respective corners of four pixel electrodes 10 adjacent in the X2 direction, the Y2 direction, and a diagonal direction of the pixel electrodes 10.

The pixel contact plug 21 is provided at one corner of the four corners of the relay layer 20 in plan view.

The contact hole 33 is provided at a position overlapping the relay layer 20 in plan view, and provided so as to overlap a gap among the four adjacent pixel electrodes 10.

The contact plug 31 is provided at a position not overlapping the pixel contact plug 21 in plan view in the embodiment. In order for the contact plug 31 and the pixel contact plug 21 not to overlap each other, the contact plug 31 is provided at the relay layer 20 to be closer to a corner diagonal to a corner at which the pixel contact plug 21 is provided.

When the pixel contact plug 21 is provided at the position not overlapping the contact plug 31 as described above, film formability of the pixel electrode 10 overlapping the pixel contact plug 21 can be improved as compared with a case in which the pixel contact plug 21 is provided at a position overlapping the contact plug 31.

The relay layer 30 is a rectangle smaller than the relay layer 20.

The contact plug 41 is provided at a position overlapping the contact plug 31. More specifically, the contact plug 41 and the contact plug 31 substantially completely overlap each other in plan view.

The capacitance electrode 40 includes a wide portion 40w, an extending portion extending from the wide portion 40w in the X1 direction to overlap the scanning line 3, and an extending portion extending from the wide portion 40w in the Y1 direction to overlap the date line 4.

The wide portion 40w has a size and a shape to overlap an entirety of the relay layer 20 and the relay layer 30 in plan view.

In the embodiment, a place at which the boundary lines 34b1 intersect overlaps the contact plug 31. This indicates that the contact plug 31 is provided to extend through the lens layer 34.

The above-described arrangement relationship among the pixel contact plug 21, the contact plug 31 and the contact plug 41 is the same even when the pixel contact plug 21 is replaced with the contact hole 23, the contact plug 31 is replaced with the contact hole 33, and the contact plug 41 is replaced with the contact hole 43.

1.5. Structure of Optical Functional Layer in Display Region of Element Substrate FIG. 6 is a cross-sectional view taken along line VI-VI in FIG. 5 and illustrates a cross-sectional structure of the optical functional layer LS.

Figure 6:
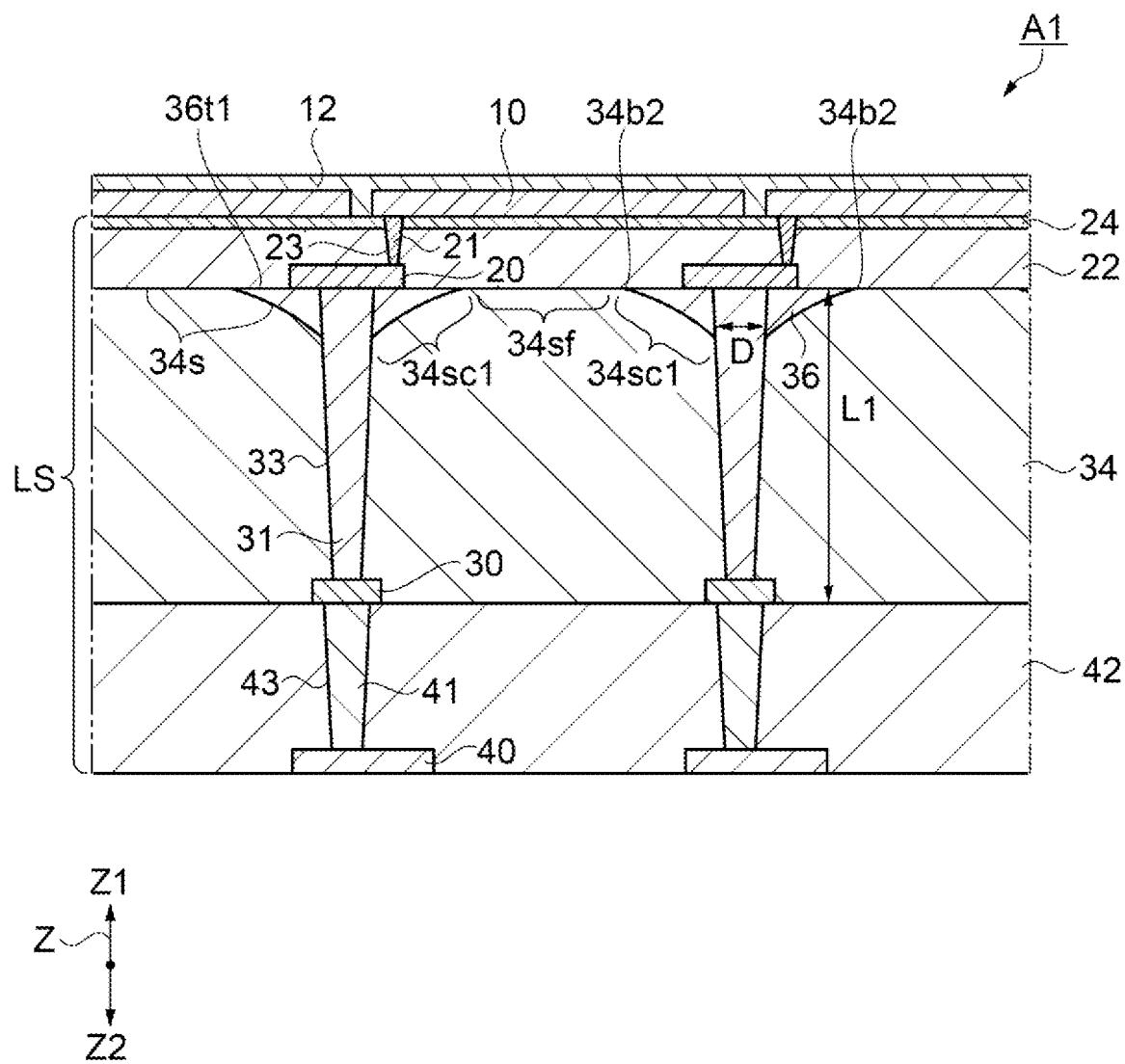
FIG. 6 is a cross-sectional view taken along line VI-VI in FIG. 5.

As illustrated in FIG. 6, the flat portion 34sf of the lens layer 34 and the upper surface 36t1 of the light transmitting layer 36 are included in the same plane.

The contact hole 33 extends through the light transmitting layer 36 the lens layer 34.

The contact plug 31 has an inverted truncated quadrangular pyramid shape. Therefore, an upper surface side of the contact plug 31 is thicker than a lower surface side.

An aspect ratio of the contact hole 33 is about twice large as an aspect ratio of other contact holes, for example, the contact hole 43. In the embodiment, since a depth L1 of the contact hole 33 is about 5 to 7 μm, and an inner diameter D of the contact hole 33 is about 1 μm. An aspect ratio L1/D is about 5 to 7.

The contact hole 33 is formed by anisotropic etching such as dry etching. It is difficult to stop the etching process of the contact hole 33 at a position at which an upper surface of the relay layer 30 is just exposed, after the contact hole 33 extends through the light transmitting layer 36 and the lens layer 34. Therefore, although not illustrated, a bottom of the contact hole 33 may be formed inside the relay layer 30.

The contact hole 33 is provided at a position overlapping the contact plug 41. This makes the etching process easier. Because, the bottom of the contact hole 33 is formed inside the contact plug 41 even when the contact hole 33 extends through the relay layer 30. Therefore, electrical connecting between the contact plug 31 filled in the contact hole 33 and the contact plug 41 can be reliably achieved.

1.6. Method of Manufacturing Optical Functional Layer

Next, a method of manufacturing the optical functional layer LS will be described with reference to FIGS. 7 to 17.

Figure 7:
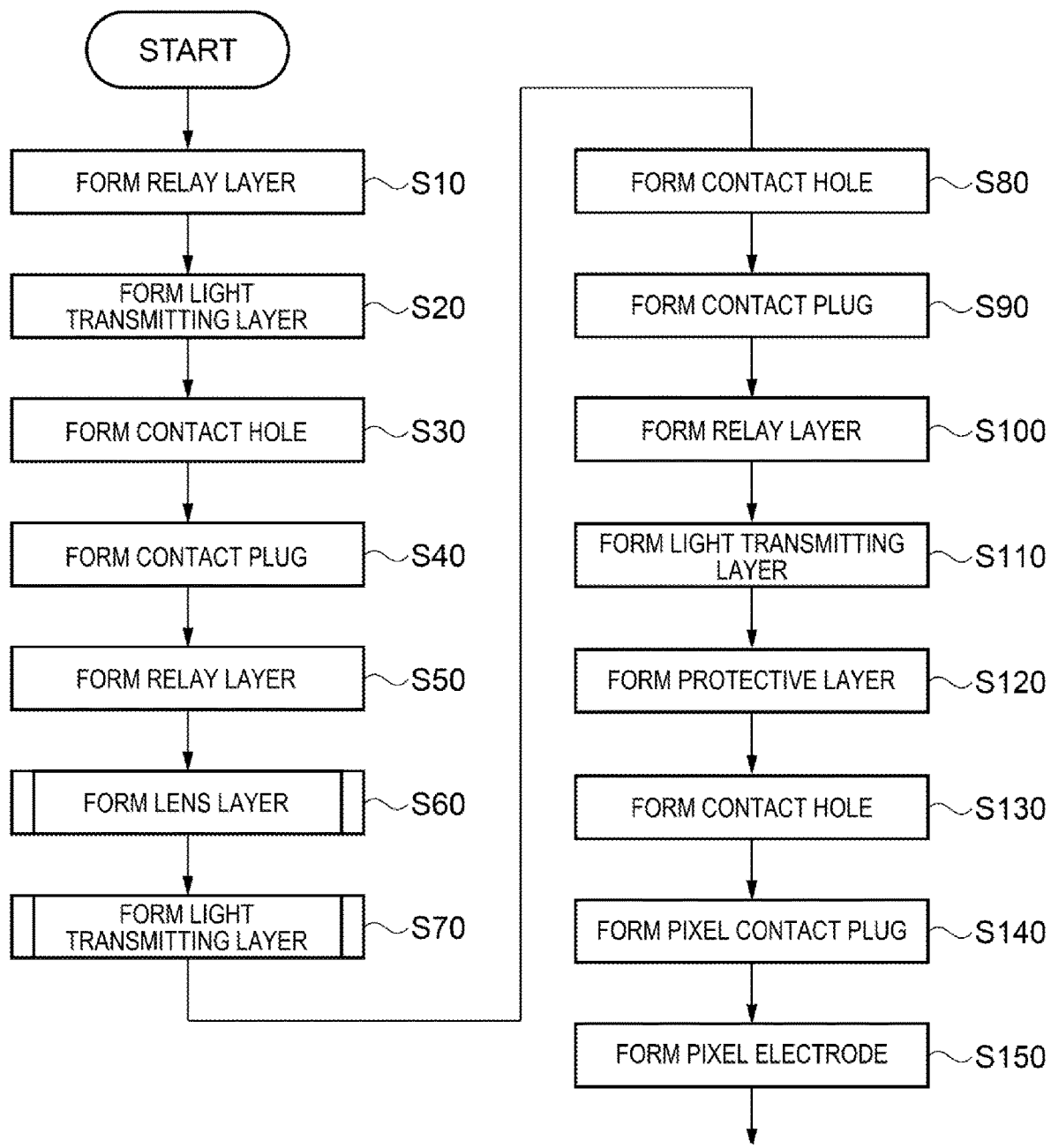
FIG. 7 is a flowchart illustrating a method of manufacturing an optical functional layer.
Figure 8:
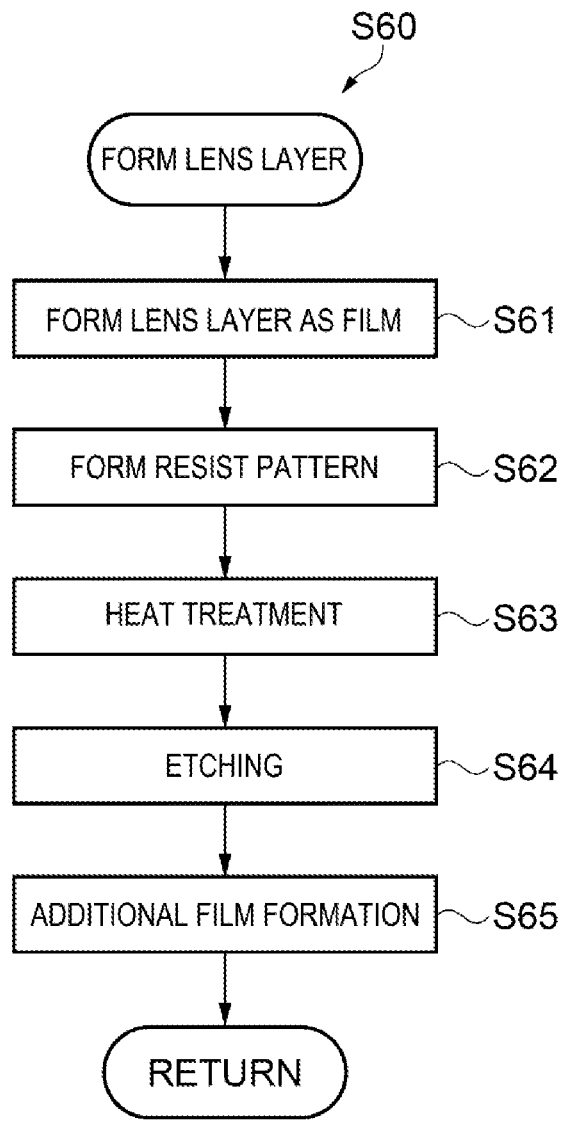
FIG. 8 is a flowchart illustrating details of step S60 in FIG. 7.
Figure 9:
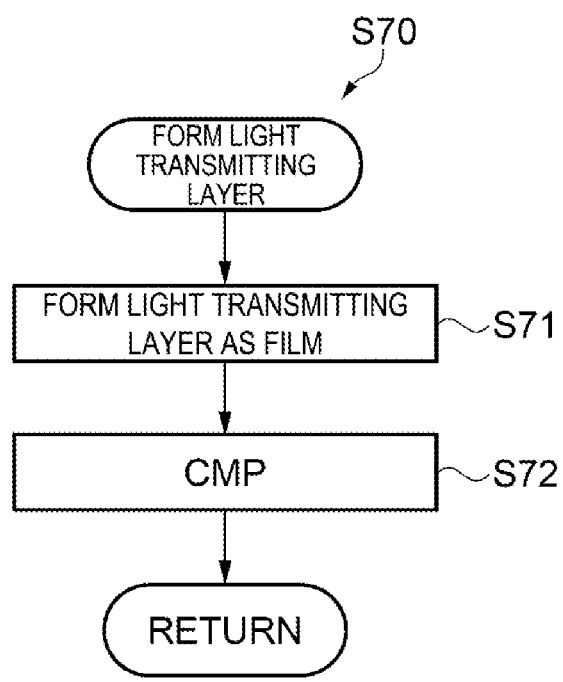
FIG. 9 is a flowchart illustrating details of step S70 in FIG. 7.

FIG. 7 is a flowchart illustrating a method of manufacturing the optical functional layer LS of the element substrate 100. FIG. 8 is a detailed flowchart of step S60 in the flowchart of FIG. 7. FIG. 9 is a detailed flowchart of step S70 in the flowchart of FIG. 7. FIGS. 10 to 17 are each a cross-sectional view illustrating one aspect in each manufacturing process, and a cross-sectional position in each drawing is the same as that in FIG. 6.

In Step S10, the capacitor electrode 40 as a relay layer is formed. The capacitor electrode 40 is formed by forming a conductive material containing titanium nitride as film at the dielectric layer 56 and then patterning the film.

In step S20, the light transmitting layer 42 made of silicon oxide is formed at the capacitance electrodes 40.

In Step S30, the contact hole 43 is formed at the light transmitting layer 42.

In step S40, the contact hole 43 is filled with tungsten to form the contact plug 41.

In Step S50, the relay layer 30 made of a conductive material containing titanium nitride is formed at a position overlapping the contact plug 41 in plan view.

In step S60, the lens layer 34 is formed. Details of step S60 will be described with reference to FIG. 8.

Figure 10:
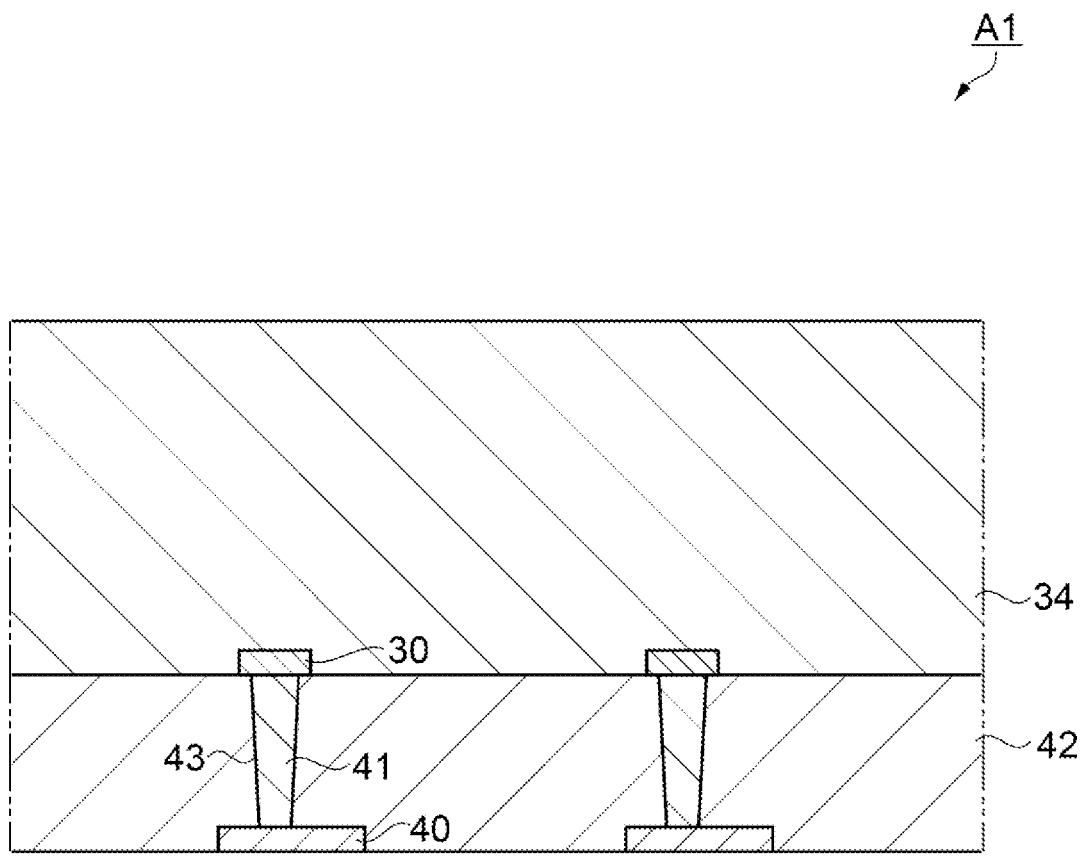
FIG. 10 is a cross-sectional view illustrating an aspect in a manufacturing process.

In step S61, the lens layer 34 is formed as film. As illustrated in FIG. 10, silicon oxynitride is formed as film having a thickness from 4000 nm to 6000 nm at the light transmitting layer 42 and the relay layer 30.

Figure 11:
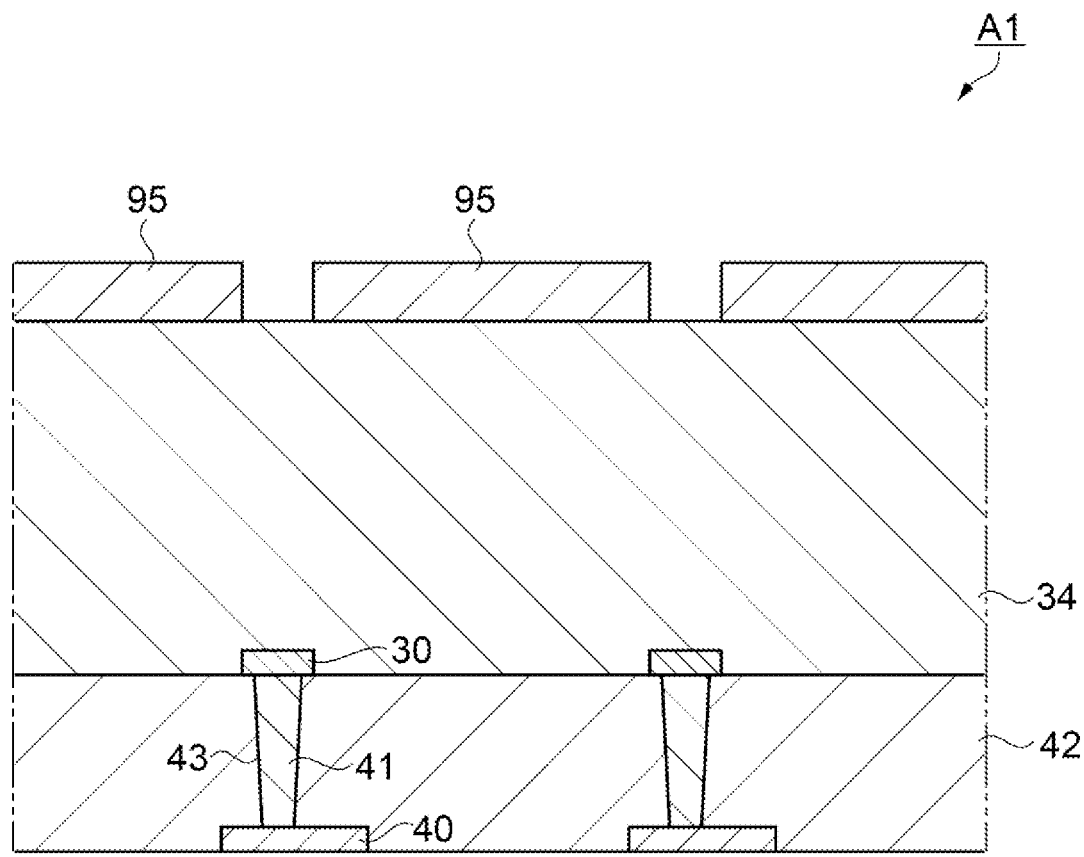
FIG. 11 is a cross-sectional view illustrating an aspect in a manufacturing process.
Figure 11:
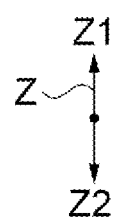

In Step S62, a resist pattern 95 is formed. After forming a photoresist layer at the lens layer 34, the photoresist layer is patterned to form the resist pattern 95 as illustrated in FIG. 11.

In step S63, the resist pattern 95 is subjected to heat treatment.

Figure 12:
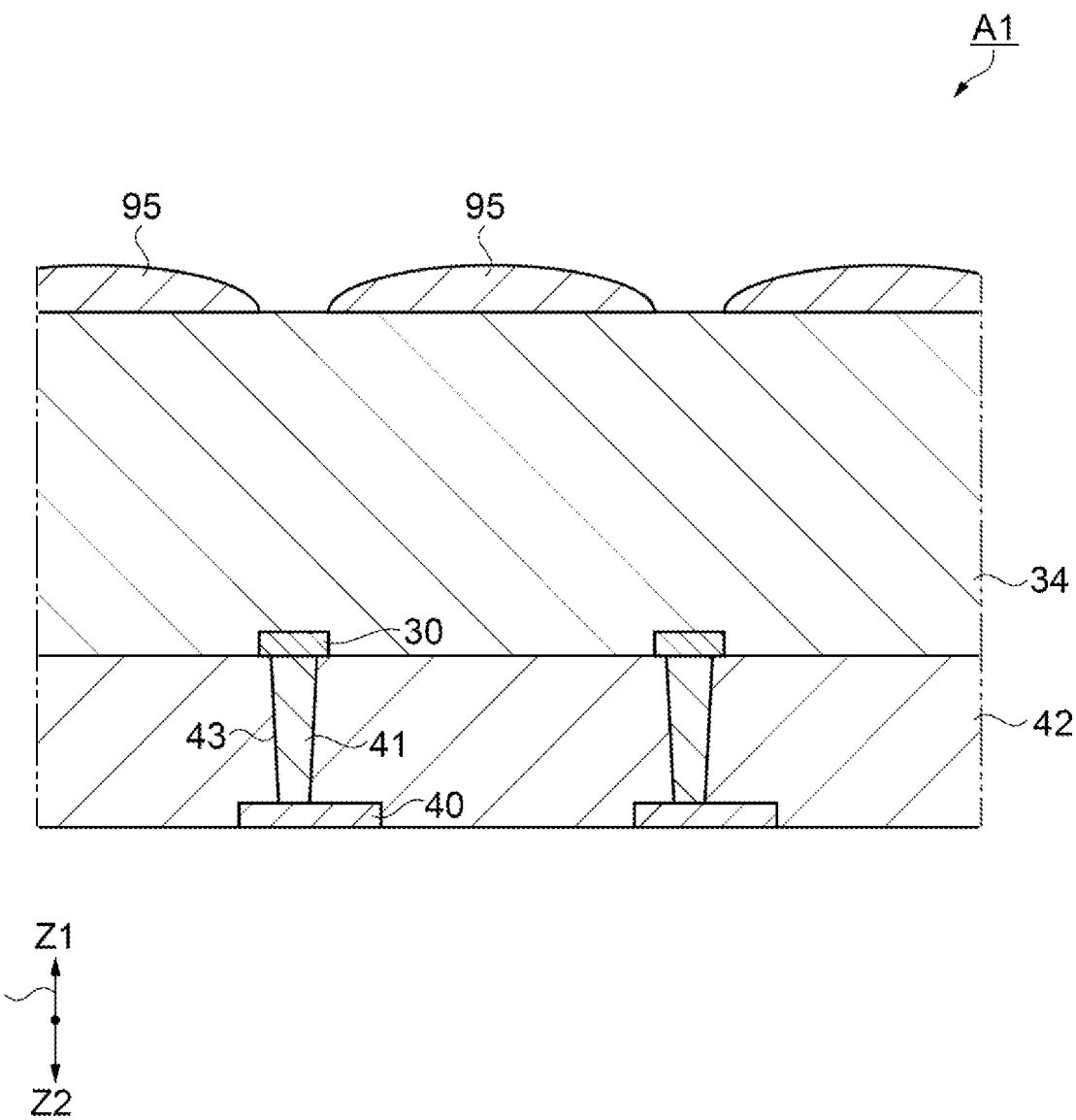
FIG. 12 is a cross-sectional view illustrating an aspect in a manufacturing process.

As illustrated in FIG. 12, the resist pattern 95 is softened and reflowed by heating. A cross-sectional shape of resist pattern 95 before the heat treatment illustrated in FIG. 11 is a rectangular shape with sharp corners. By applying the heat treatment on the resist pattern 95, the corners of the resist pattern 95 are rounded, and the cross-sectional shape of the resist pattern 95 becomes an elliptical shape having a gently curved surface as illustrated in FIG. 12.

Figure 13:
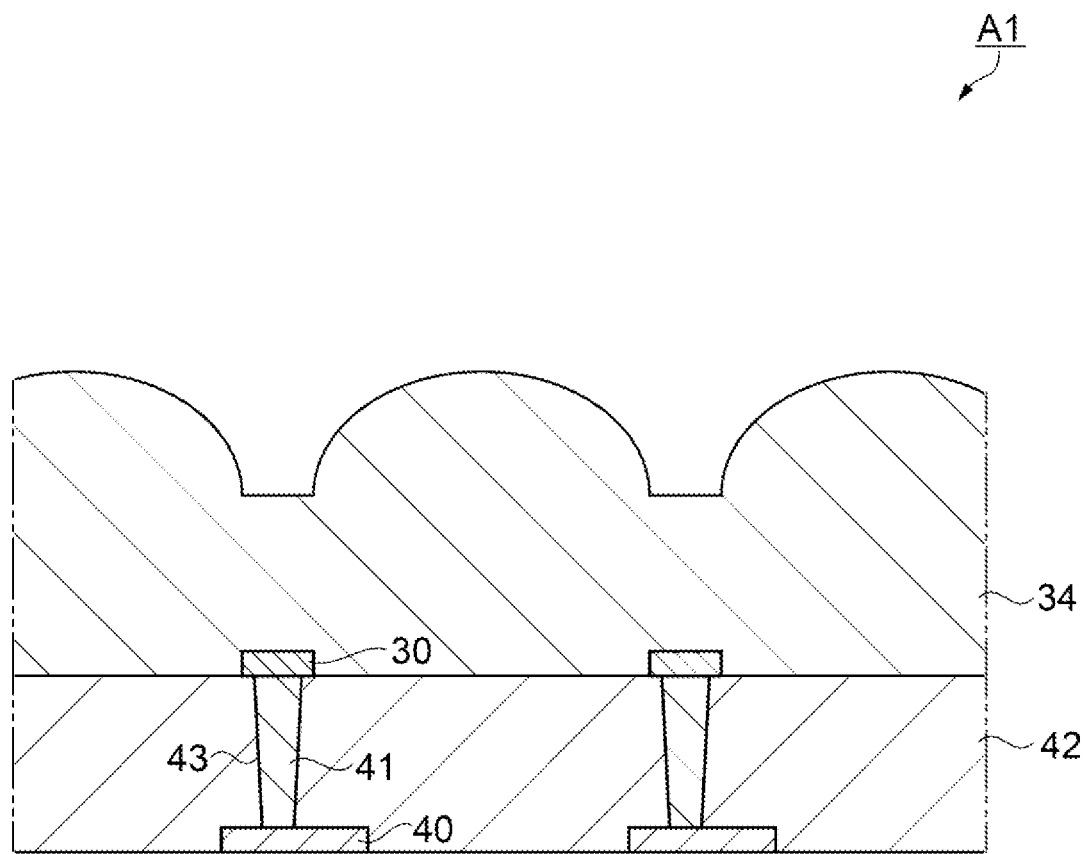
FIG. 13 is a cross-sectional view illustrating an aspect in a manufacturing process.
Figure 13:
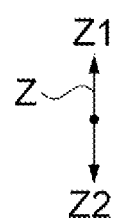

In Step S64, etching is performed. As illustrated in FIG. 13, the shape of the resist pattern 95 is transferred to an upper surface of the lens layer 34 by dry etching. By the etching, a convex shape reflecting the shape of the resist pattern 95 is formed at the upper surface of the lens layer 34.

In the embodiment, etching is performed such that a thickness of the lens layer 34 between adjacent convex shapes is 500 nm to 3000 nm.

Figure 14:
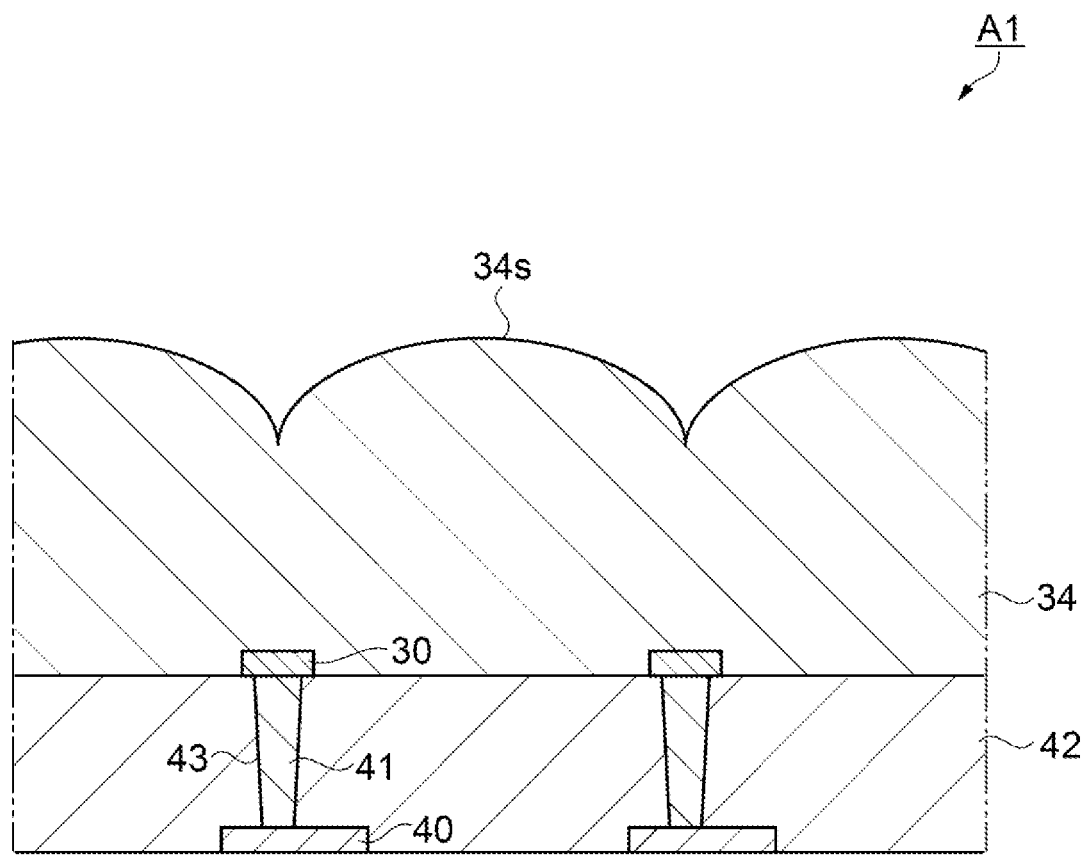
FIG. 14 is a cross-sectional view illustrating an aspect in a manufacturing process.

In Step S65, additional film formation is performed. Silicon oxynitride is formed as film to have a thickness from 1500 nm to 2000 nm, between the convex shape and the adjacent convex shape of the lens layer 34. In this process, as illustrated in FIG. 14, the additional film formation is performed until a gap between the adjacent convex shapes is filled, and the adjacent convex shapes come into contact with each other.

Reference is now made back to FIG. 7.

In step S70, the light transmitting layer 36 is formed. Details of step S70 will be described with reference to FIG. 9.

Figure 15:
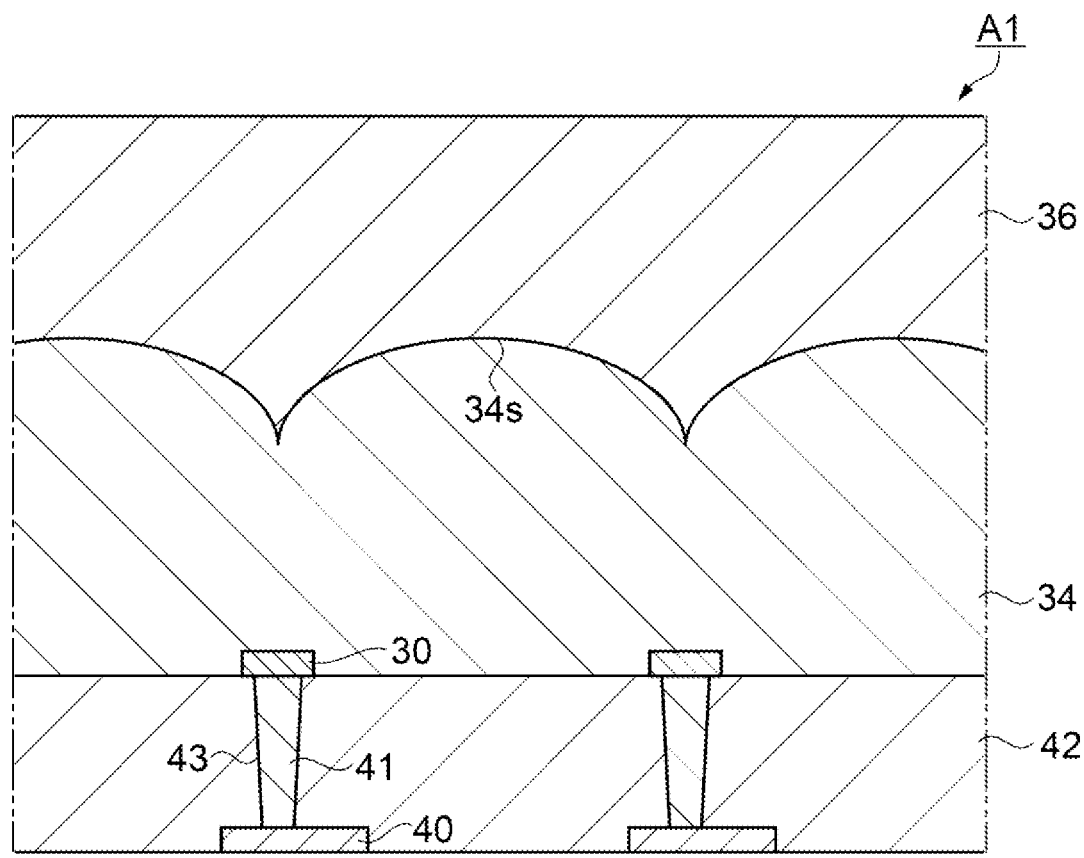
FIG. 15 is a cross-sectional view illustrating an aspect in a manufacturing process.
Figure 15:
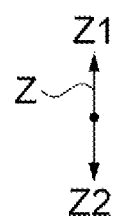

In step S71, the light transmitting layer 36 is formed as film. As illustrated in FIG. 15, silicon oxide is formed as film to have a thickness of about 6000 nm at the lens layer 34.

Figure 16:
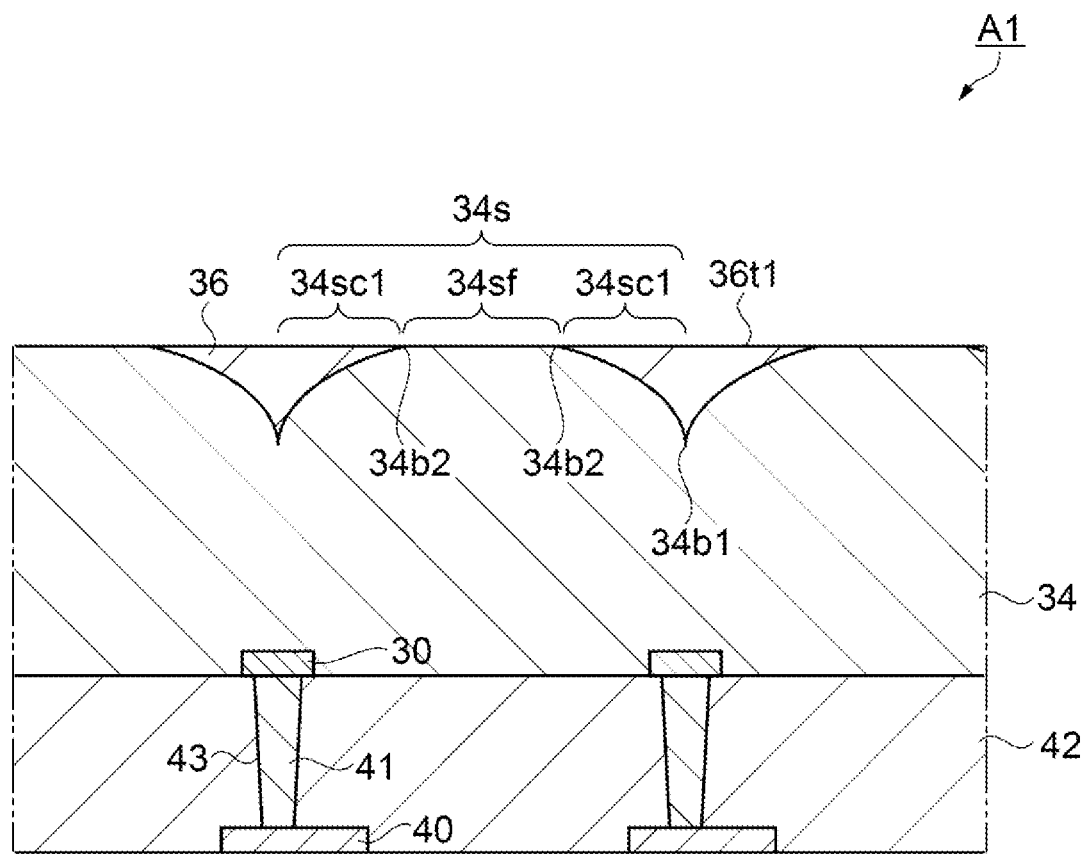
FIG. 16 is a cross-sectional view illustrating an aspect in a manufacturing process.
Figure 16:
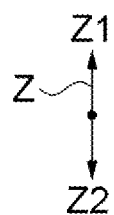

In Step S72, CMP is performed. The light transmitting layer 36 is planarized by CMP. By performing CMP until a central portion of the lens surface 34s is exposed, the flat portion 34sf formed of a flat surface planarized by CMP is formed at the central portion of the lens surface 34s as illustrated in FIG. 16. The flat portion 34sf belongs to the same plane as the upper surface 36t1 of the light transmitting layer 36.

By this process, the lens surface 34s is provided with the planarized flat portion 34sf and the curved surface portion 34sc1 which is not planarized around the flat portion 34sf.

Reference is now made back to FIG. 7.

In step S80, the contact hole 33 is formed. The light transmitting layer 36 and the lens layer 34 are applied with anisotropic etching to form the contact hole 33 that exposes the relay layer 30.

In the embodiment, since a thickness of the light transmitting layer 36 is reduced by CMP until the central portion of the lens surface 34s is exposed, the aspect ratio of the contact hole 33 is smaller as compared to a case where CMP is not performed. Therefore, the contact hole 33 can be easily formed.

In Step S90, the contact plug 31 is formed. The contact plug 31 made of tungsten is formed inside the contact hole 33. In the embodiment, since the aspect ratio of the contact hole 33 is made small, the contact plug 31 can be easily formed. Therefore, it is possible to form the contact plug 31 with high quality, and improve reliability of electrical connecting between the pixel electrode 10 and the transistor 1.

Figure 17:
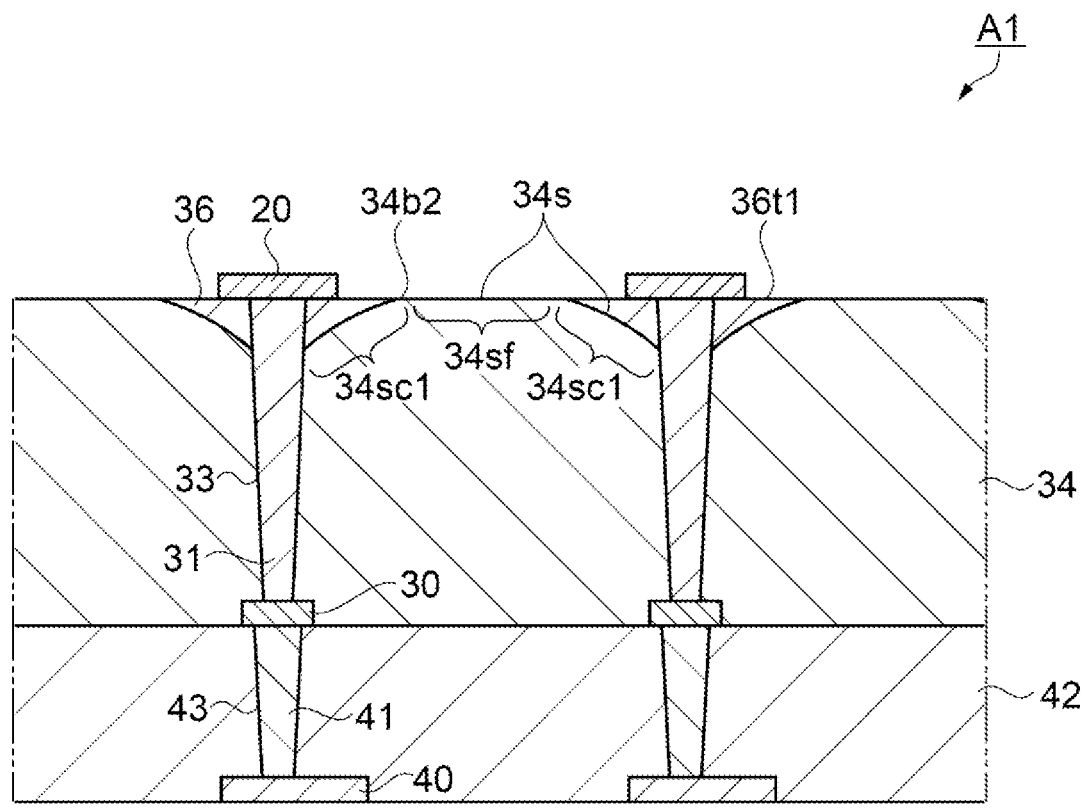
FIG. 17 is a cross-sectional view illustrating an aspect in a manufacturing process.
Figure 17:
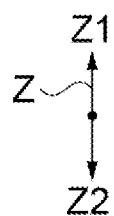

In Step S100, the relay layer 20 is formed. As illustrated in FIG. 17, the relay layer 20 made of a material containing titanium nitride and aluminum, or tungsten is formed at the contact plug 31.

In Step S110, the light transmitting layer 22 is formed at the relay layer 20.

In step S120, the protective layer 24 is formed.

In Step S130, the contact hole 23 that extends through the protective layer 24 and the light transmitting layer 22 and exposes the relay layer 20 is formed.

In Step S140, the pixel contact plug 21 is formed at the contact hole 23.

In step S150, the pixel electrode 10 is formed.

As described above, the liquid crystal device 300 as the electro-optical device of the embodiment includes the transistor 1, the pixel electrode 10 provided corresponding to the transistor 1, the lens layer 34 provided at a layer between the transistor 1 and the pixel electrode 10, the light transmitting layer 36 provided at a layer between the lens layer 34 and the pixel electrode 10, and planarized together with the lens layer 34, the relay layer 30 provided at a layer between the transistor 1 and the lens layer 34, and the relay layer 20 provide at a layer between the light transmitting layer 36 and the pixel electrode 10, and electrically connected to the relay layer 30 via the contact hole 33.

Since the light transmitting layer 36 is planarized together with the lens layer 34 in this manner, the thickness of the light transmitting layer 36 can be reduced. Therefore, the aspect ratio of the contact hole 33 can be reduced, and the contact hole 33 can be easily formed.

In the liquid crystal device 300 of the embodiment, the lens layer 34 further includes the flat portion 34sf on the pixel electrode 10 side and the curved surface portion 34sc1 surrounding the flat portion 34sf.

As described above, since the lens layer 34 includes the flat portion 34sf planarized together with the light transmitting layer 36, the thickness of the light transmitting layer 36 is reduced and the formation of the contact hole 33 is facilitated. Furthermore, light incident on the pixel P along the Z2 direction, in other words, light incident on the pixel P straight passes through the lens layer 34 straight without being refracted at the flat portion 34sf. Therefore, a bright pixel P can be achieved.

In addition, in the liquid crystal device 300 of the embodiment, the lens layer 34 includes the lens surface 34s protruding toward the pixel electrode 10.

As described above, since the lens surface 34s protruding toward the pixel electrode 10 can refract light obliquely incident on the pixel P, and change the light to light in the Z2 direction, it is possible to suppress light to be lost and achieve the bright pixel P.

The liquid crystal device 300 of the embodiment further includes the light transmitting layer 22 including the contact hole 23 for electrically connecting the relay layer 20 and the pixel electrode 10, and the contact hole 33 and the contact hole 23 are provided so as not to overlap each other in plan view.

As described above, since the contact hole 33 and the contact hole 23 do not overlap each other in plan view, the contact hole 33 can be disposed at a gap between the adjacent pixels P, and a wide opening region through which light passes can be secured. Further, the film formability of the pixel electrode 10 can be improved.

The liquid crystal device 300 of the embodiment further includes the light transmitting layer 42 including the contact hole 43 for electrically connecting the relay layer 30 and the transistor 1, and the contact hole 43 and the contact hole 33 are provided so as to overlap each other in plan view.

As described above, since the contact hole 43 and the contact hole 33 are provided so as to overlap each other in plan view, even when the contact hole 33 extends through the relay layer 30 during formation of the contact hole 33, electrical conduction via the contact hole 33 can be achieved. Therefore, the contact hole 33 can be easily formed. Furthermore, it is possible to reduce a region shielded from light with the contact hole 33 and the contact hole 43, and a wider opening region through which light passes can be secured.

The liquid crystal device 300 of the embodiment further includes the contact plug 31, the pixel contact plug 21 and the contact plug 41 as connecting members inside the contact hole 33, the contact hole 23 and the contact hole 43, respectively.

In the liquid crystal device 300 of the embodiment, since the aspect ratio of the contact hole 33 can be reduced, the contact hole 33 and the contact plug 31 provided inside the contact hole 33 can be easily formed. Therefore, quality of the contact hole 33 and the contact plug 31 is improved, and it is possible to improve the reliability of electrical connecting between the pixel electrode 10 and the transistor 1.

A method of manufacturing the liquid crystal device 300 as the electro-optical device of the embodiment includes forming the relay layer 30, forming the lens layer 34 including the lens surface 34s at the relay layer 30, stacking the light transmitting layer 36 at the lens layer 34, applying polishing treatment on the light transmitting layer 36 until a part of the lens surface 34s of the lens layer 34 is exposed, forming the contact hole 33 by etching the light transmitting layer 36 and the lens layer 34, and forming the relay layer 20 at a position overlapping the contact hole 33.

As described above, since the light transmitting layer 36 is applied with the polishing treatment until a part of the lens surface 34s of the lens layer 34 is exposed, the thickness of the light transmitting layer 36 can be reduced. Therefore, the aspect ratio of the contact hole 33 can be reduced, and the contact hole 33 can be easily formed.

2. Embodiment 2

2.1. Structure of Display Region of Element Substrate

A structure of the liquid crystal device 300 as an electro-optical device according to Embodiment 2 will be described with reference to FIGS. 18 and 19.

Figure 18:
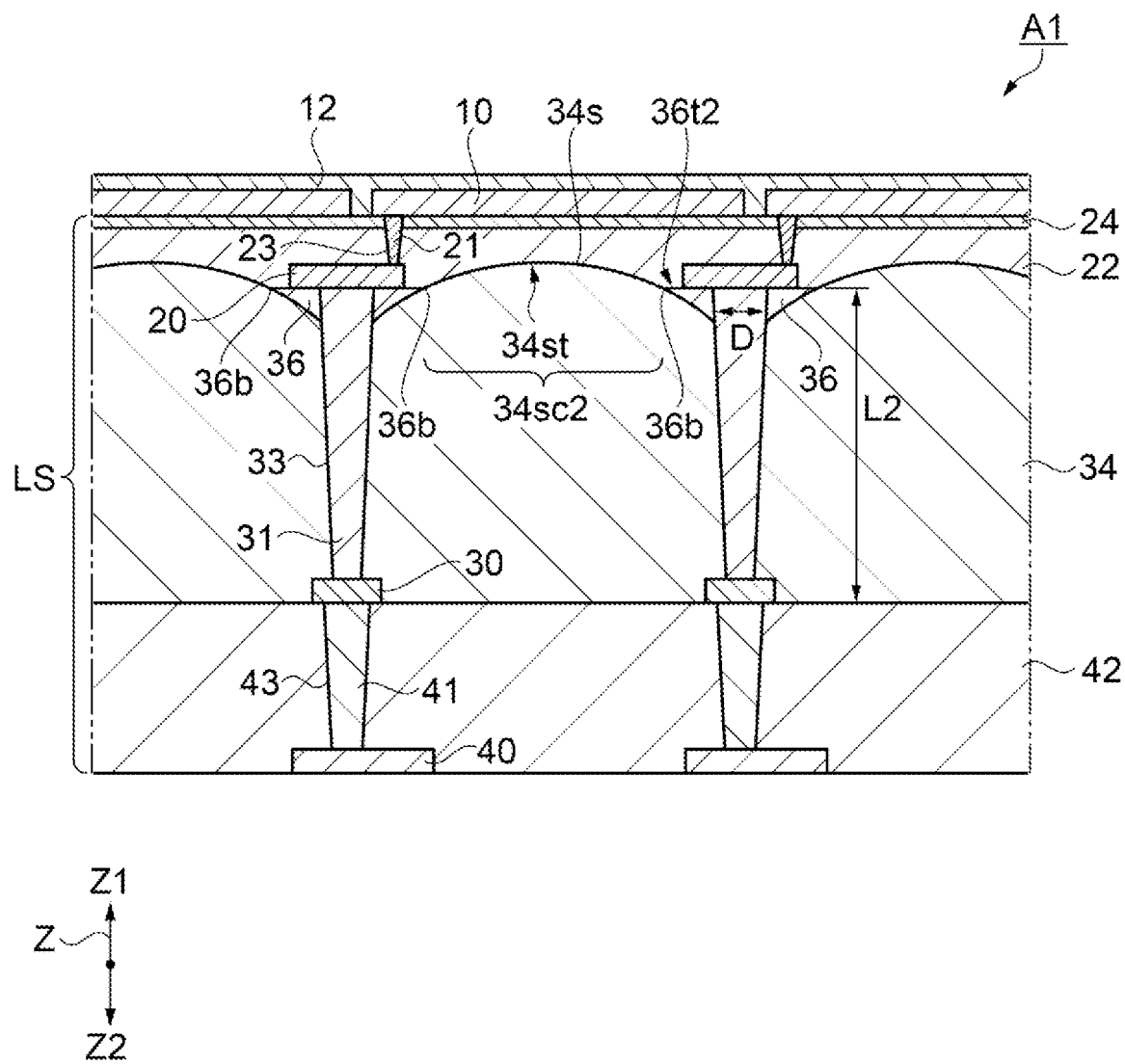
FIG. 18 is a cross-sectional view of an electro-optical device according to Embodiment 2.
Figure 19:
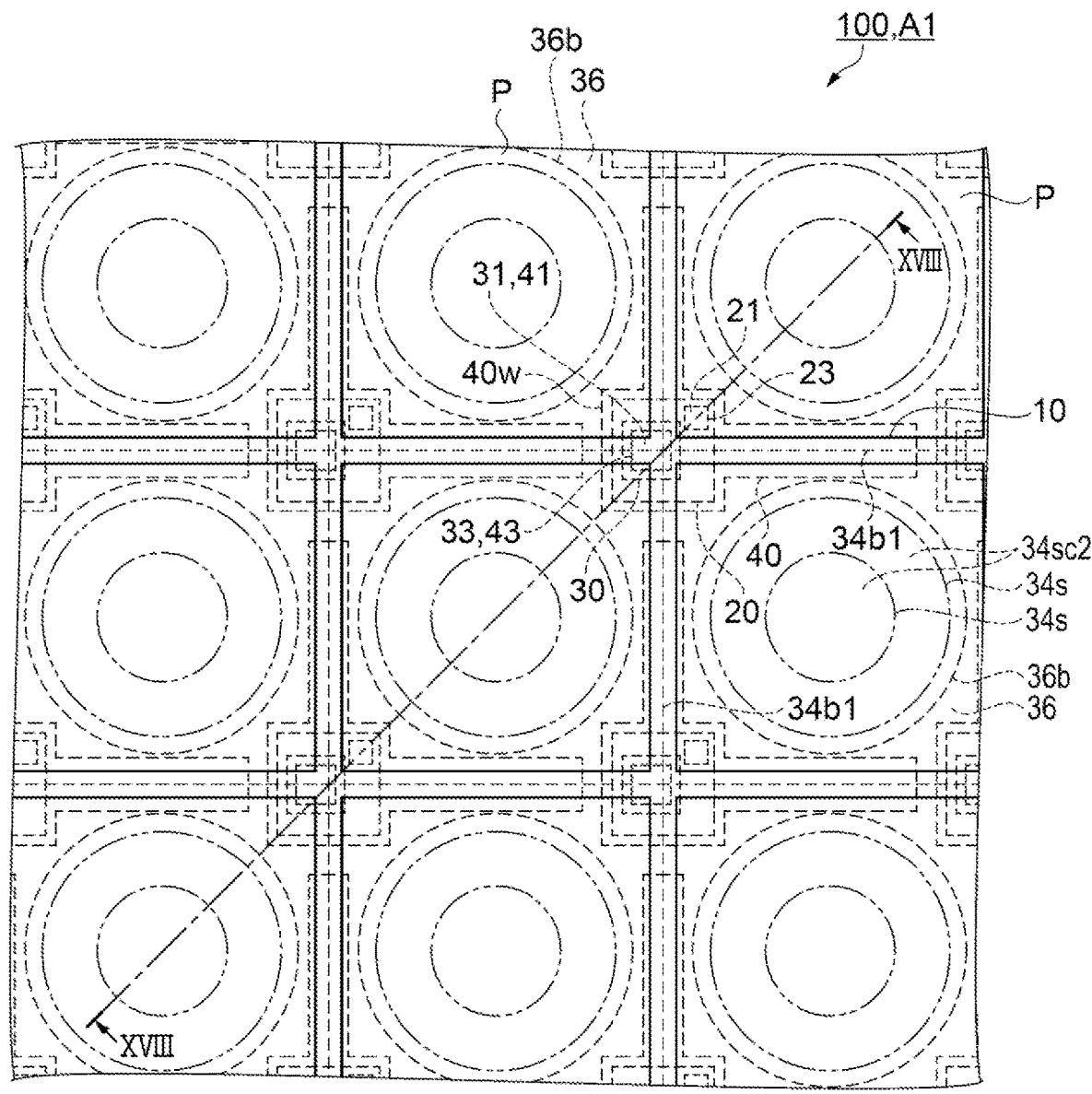
FIG. 19 is a plan view illustrating a part of a display region of an element substrate.

FIG. 18 is a cross-sectional view of the electro-optical device according to Embodiment 2, taken along line XVIII-XVIII in FIG. 19. FIG. 19 is a plan view illustrating a part of a display region of an element substrate, and is a view of the display region A1 of the element substrate 100 when seen from the liquid crystal layer Lc side in the Z2 direction, similarly to FIG. 5.

Embodiment 2 is different from Embodiment 1 in that the lens surface 34s does not include the flat portion 34sf. The same reference numerals are given to the same configurations as in Embodiment 1, and the description thereof will be omitted.

As illustrated in FIG. 18, the lens surface 34s includes a vertex 34st at a center, and the vertex 34st is located closer to the pixel electrode 10 than an upper surface 36t2 of the light transmitting layer 36.

An outer edge 36b of the upper surface 36t2 of the light transmitting layer 36 is in contact with a curved surface of the lens surface 34s.

In the embodiment, of the curved surface of the lens surface 34s, a curved surface closer to the pixel electrode 10 than the outer edge 36b of the upper surface 36t2 of the light transmitting layer 36, in other words, a curved surface not overlapping the light transmitting layer 36 will be described as a curved surface portion 34sc2 as a lens curved surface.

The relay layer 20 is provided between the adjacent curved surface portions 34sc2 in cross-sectional view.

In the embodiment, a depth L2 of the contact hole 33 is less than the depth L1 of the contact hole 33 of Embodiment 1, and an aspect ratio L2/D of the contact hole 33 is less than the aspect ratio L1/D of the contact hole 33 of Embodiment 1. This is because, as will be described later, a position of the upper surface 36t2 of the light transmitting layer 36 can be brought closer to the relay layer 30 than the vertex 34st of the lens surface 34s by selectively etching the light transmitting layer 36.

In FIG. 19, the outer edge 36b of the upper surface 36t2 of the light transmitting layer 36 is indicated by a broken line.

An outer side of the circular outer edge 36b is a region where the light transmitting layer 36 is provided at the lens surface 34s, and an inner side thereof is the curved surface portion 34sc2 that does not overlap the light transmitting layer 36.

The light transmitting layer 36 is provided between the adjacent curved surface portions 34sc2 of the lens layer 34 in plan view. The light transmitting layer 36 is continuously provided along the X-axis and the Y-axis between the adjacent curved surface portions 34sc2.

2.2. Method of Manufacturing Optical Functional Layer

Next, a method of manufacturing the optical functional layer LS of Embodiment 2 will be described with reference to FIGS. 20 to 23.

Figure 20:
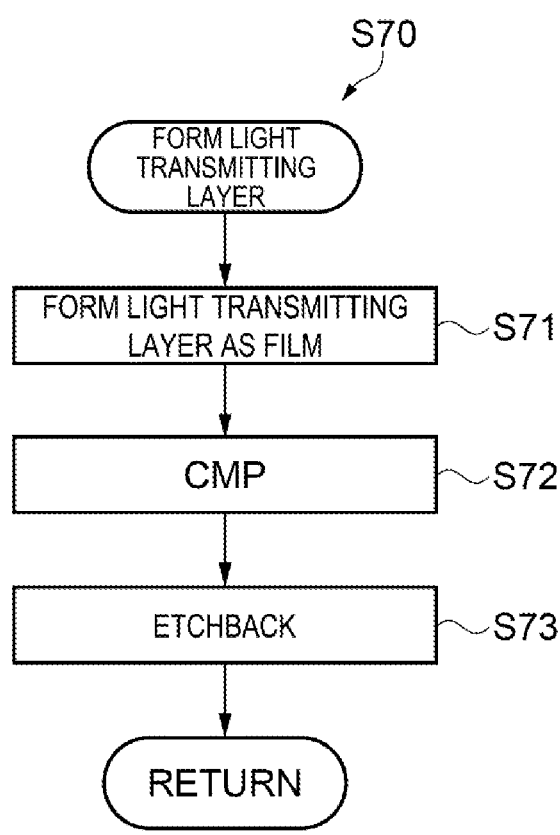
FIG. 20 is a flowchart illustrating details of step S70 in FIG. 7.
Figure 21:
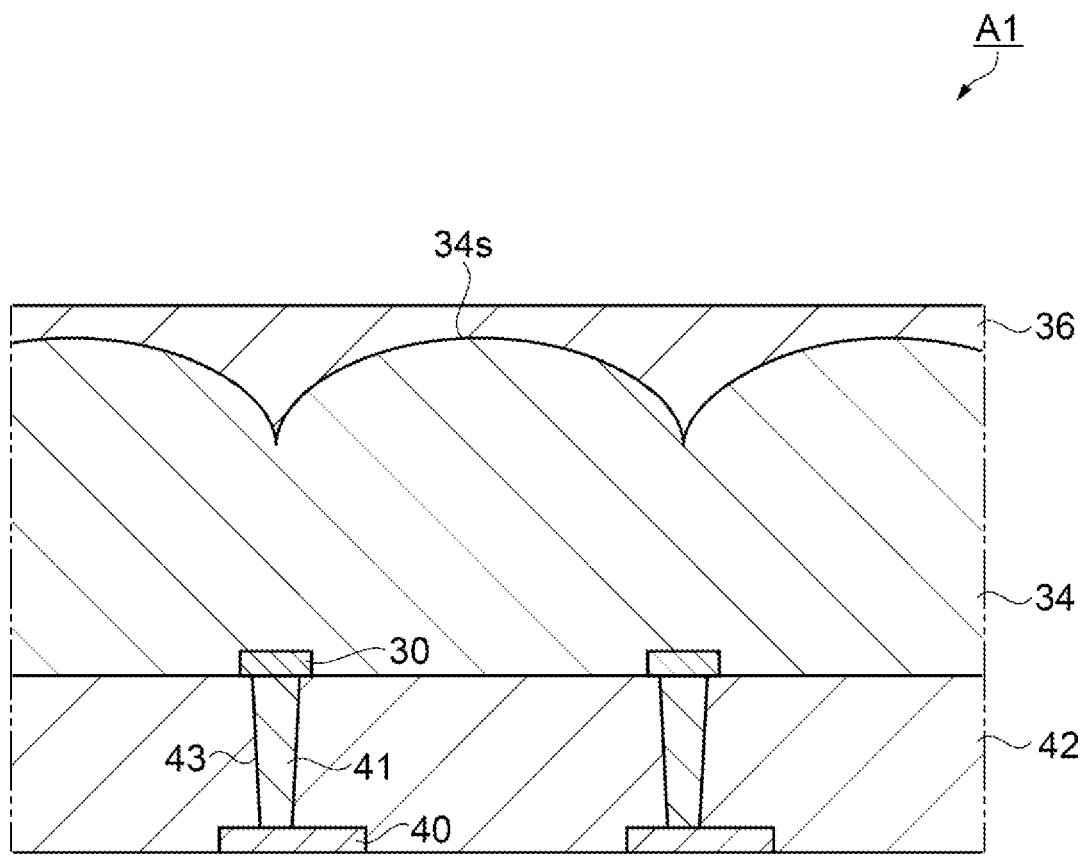
FIG. 21 is a cross-sectional view illustrating an aspect in a manufacturing process.
Figure 21:
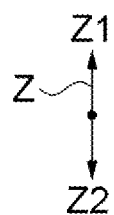
Figure 22:
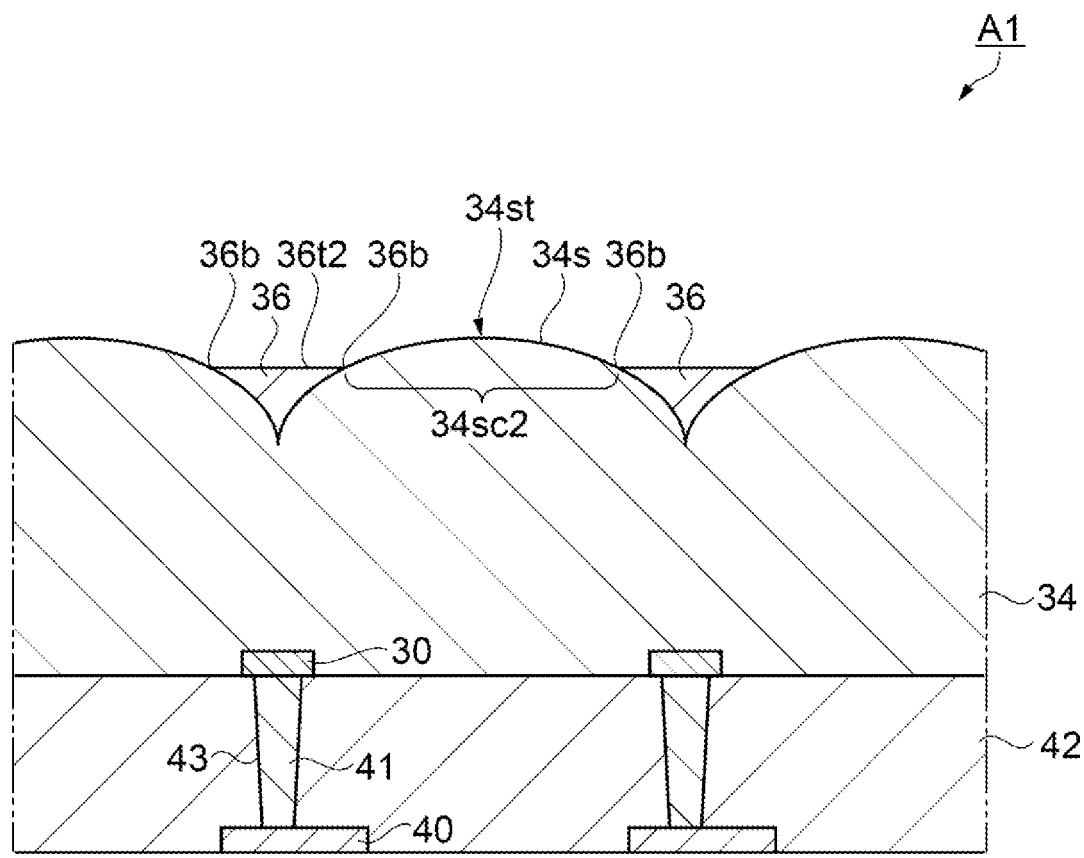
FIG. 22 is a cross-sectional view illustrating an aspect in a manufacturing process.
Figure 23:
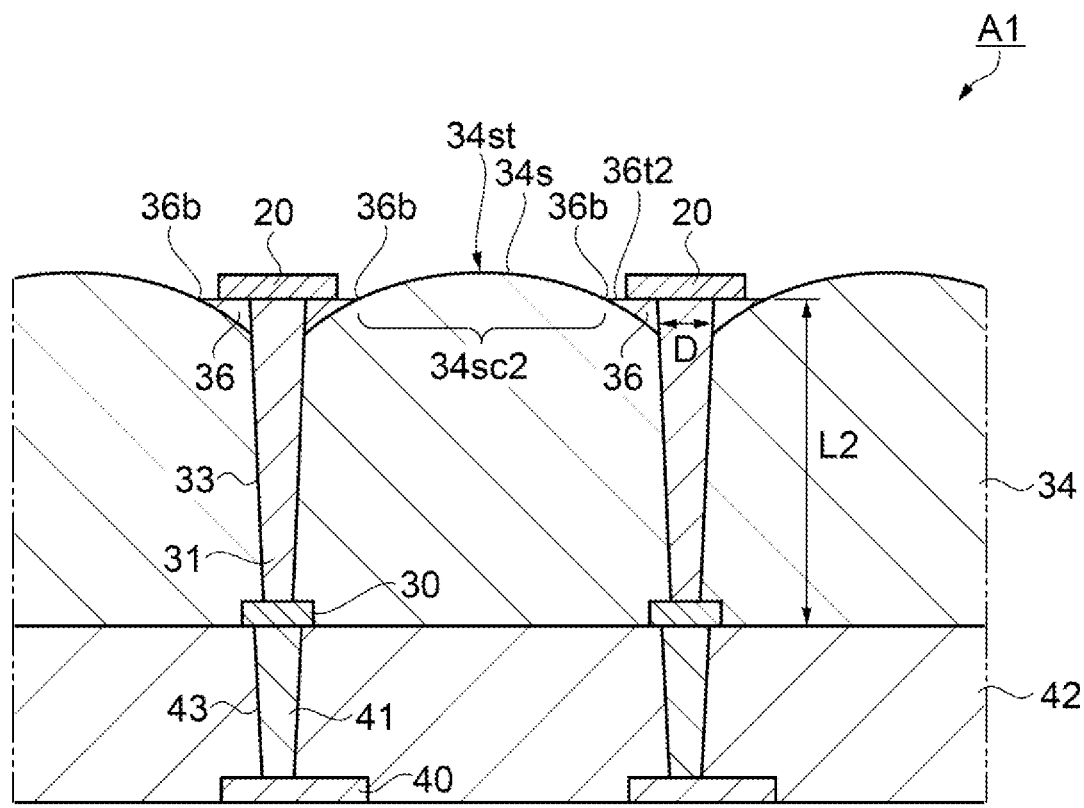
FIG. 23 is a cross-sectional view illustrating an aspect in a manufacturing process.

FIG. 20 is a detailed flowchart of step S70 in the flowchart of FIG. 7. FIGS. 21 to 23 are each a cross-sectional view illustrating one aspect in each manufacturing process, and a cross-sectional position in each drawing is the same as that in FIG. 6.

In the embodiment, step S70 in the flowchart of FIG. 7 is different from that in Embodiment 1. Since steps S10 to S60 and steps S80 to S150 are the same as those in Embodiment 1, the description thereof will be omitted or simplified.

In step S71, the light transmitting layer 36 is formed as film. As in Embodiment 1, silicon oxide is formed as film to have a thickness of about 6000 nm at the lens layer 34.

In Step S72, CMP is performed. The light transmitting layer 36 is planarized by CMP.

In the embodiment, CMP is performed until the light transmitting layer 36 at the lens surface 34s is approximately from 1000 nm to 2000 nm. As illustrated in FIG. 21, the light transmitting layer 36 remains at the lens surface 34s.

In Step S73, etchback is performed. In this process, silicon oxide is selectively etched by utilizing a difference in etch rate between silicon oxide and silicon oxynitride.

Therefore, etching of the light transmitting layer 36 made of silicon oxide proceeds faster than etching of the lens layer 34 made of silicon oxynitride.

In the embodiment, as illustrated in FIG. 22, the etchback is performed until the upper surface 36t2 of the light transmitting layer 36 is positioned closer to the relay layer 30 than the vertex 34st of the lens surface 34s.

Thereafter, as illustrated in FIG. 23, the contact hole 33 is formed at the upper surface 36t2 of the light transmitting layer 36, the contact plug 31 is formed inside the contact hole 33, and the relay layer 20 is formed at the contact plug 31.

In the embodiment, the aspect ratio L2/D of the contact hole 33 can be made smaller as compared to Embodiment 1, and the formation of the contact hole 33 and the formation of the contact plug 31 can be performed more easily than in Embodiment 1. Therefore, it is possible to form the contact hole 33 and the contact plug 31 with high quality, and improve reliability of electrical connecting between the pixel electrode 10 and the transistor 1.

As described above, according to the liquid crystal device 300 as the electro-optical device of the embodiment, the following effects can be obtained in addition to the effects of the above embodiment.

The liquid crystal device 300 of the embodiment includes the transistor 1, the pixel electrode 10 provided corresponding to the transistor 1, the lens layer 34 provided at a layer between the transistor 1 and the pixel electrode 10, the light transmitting layer 36 provided at a layer between the lens layer 34 and the pixel electrode 10, and provided between the curved surface portions 34sc2 as adjacent lens curved surfaces of the lens layer 34 in plan view, the relay layer 30 provided at a layer between the transistor 1 and the lens layer 34, and the relay layer 20 provide at a layer between the light transmitting layer 36 and the pixel electrode 10, and electrically connected to the relay layer 30 via the contact hole 33.

As described above, since the light transmitting layer 36 is provided between the adjacent curved surface portions 34sc2 of the lens layer 34 in plan view, it is possible to reduce a thickness of the light transmitting layer 36. Therefore, an aspect ratio of the contact hole 33 can be reduced, and the contact hole 33 can be easily formed.

In addition, in the liquid crystal device 300 of the embodiment, the relay layer 20 is provided between the curved surface portions 34sc2 as lens curved surfaces adjacent to each other of the lens layer 34 in plan view.

As described above, since the relay layer 20 is provided between the adjacent curved surface portions 34sc2 of the lens layer 34 in plan view, the relay layer 20 can be brought close to the relay layer 30. Therefore, the aspect ratio of the contact hole 33 can be reduced, and the contact hole 33 can be easily formed.

In addition, in the liquid crystal device 300 of the embodiment, the lens layer 34 includes the lens surface 34s protruding toward the pixel electrode 10.

As described above, since the lens surface 34s protruding toward the pixel electrode 10 can refract light obliquely incident on the pixel P, and change the light to light in the Z2 direction, it is possible to suppress light to be lost and achieve the bright pixel P.

In addition, in the liquid crystal device 300 of the embodiment, the vertex 34st at a center of the lens surface 34s of the lens layer 34 is located closer to the pixel electrode 10 than the upper surface 36t2 of the light transmitting layer 36 on the pixel electrode 10 side.

According to this configuration, the upper surface 36t2 of the light transmitting layer 36 is located closer to the relay layer 30 than the vertex 34st of the lens surface 34s of the lens layer 34. Therefore, the aspect ratio of the contact hole 33 can be reduced, and the contact hole 33 can be easily formed.

The liquid crystal device 300 of the embodiment further includes the light transmitting layer 22 including the contact hole 23 for electrically connecting the relay layer 20 and the pixel electrode 10, and the contact hole 33 and the contact hole 23 are provided so as not to overlap each other in plan view.

As described above, since the contact hole 33 and the contact hole 23 do not overlap each other in plan view, the contact hole 33 can be disposed at a gap between the adjacent pixels P, and a wide opening region through which light passes can be secured. Further, the film formability of the pixel electrode 10 can be improved.

The liquid crystal device 300 of the embodiment further includes the light transmitting layer 42 including the contact hole 43 for electrically connecting the relay layer 30 and the transistor 1, and the contact hole 43 and the contact hole 33 are provided so as to overlap each other in plan view.

As described above, since the contact hole 43 and the contact hole 33 are provided so as to overlap each other in plan view, even when the contact hole 33 extends through the relay layer 30 during formation of the contact hole 33, electrical conduction via the contact hole 33 can be achieved. Therefore, the contact hole 33 can be easily formed. Furthermore, it is possible to reduce a region shielded from light with the contact hole 33 and the contact hole 43, and a wider opening region through which light passes can be secured.

The liquid crystal device 300 of the embodiment further includes the contact plug 31, the pixel contact plug 21 and the contact plug 41 as connecting members inside the contact hole 33, the contact hole 23 and the contact hole 43, respectively.

In the liquid crystal device 300 of the embodiment, since the aspect ratio of the contact hole 33 can be reduced, the contact hole 33 and the contact plug 31 provided inside the contact hole 33 can be easily formed. Therefore, it is possible to improve the reliability of the electrical connecting between the pixel electrode 10 and the transistor 1.

A method of manufacturing the liquid crystal device 300 as the electro-optical device of the embodiment includes forming the relay layer 30, forming the lens layer 34 including the lens surface 34s at the relay layer 30, stacking the light transmitting layer 36 at the lens layer 34, etching the light transmitting layer 36 until a part of the lens surface 34s of the lens layer 34 is exposed, forming the contact hole 33 by etching the light transmitting layer 36 and the lens layer 34, and forming the relay layer 20 at a position overlapping the contact hole 33.

As described above, since the light transmitting layer 36 is etched until a part of the lens surface 34s of the lens layer 34 is exposed, the thickness of the light transmitting layer 36 can be reduced. Therefore, the aspect ratio of the contact hole 33 can be reduced, and the contact hole 33 can be easily formed.

3. Embodiment 3

Figure 24:
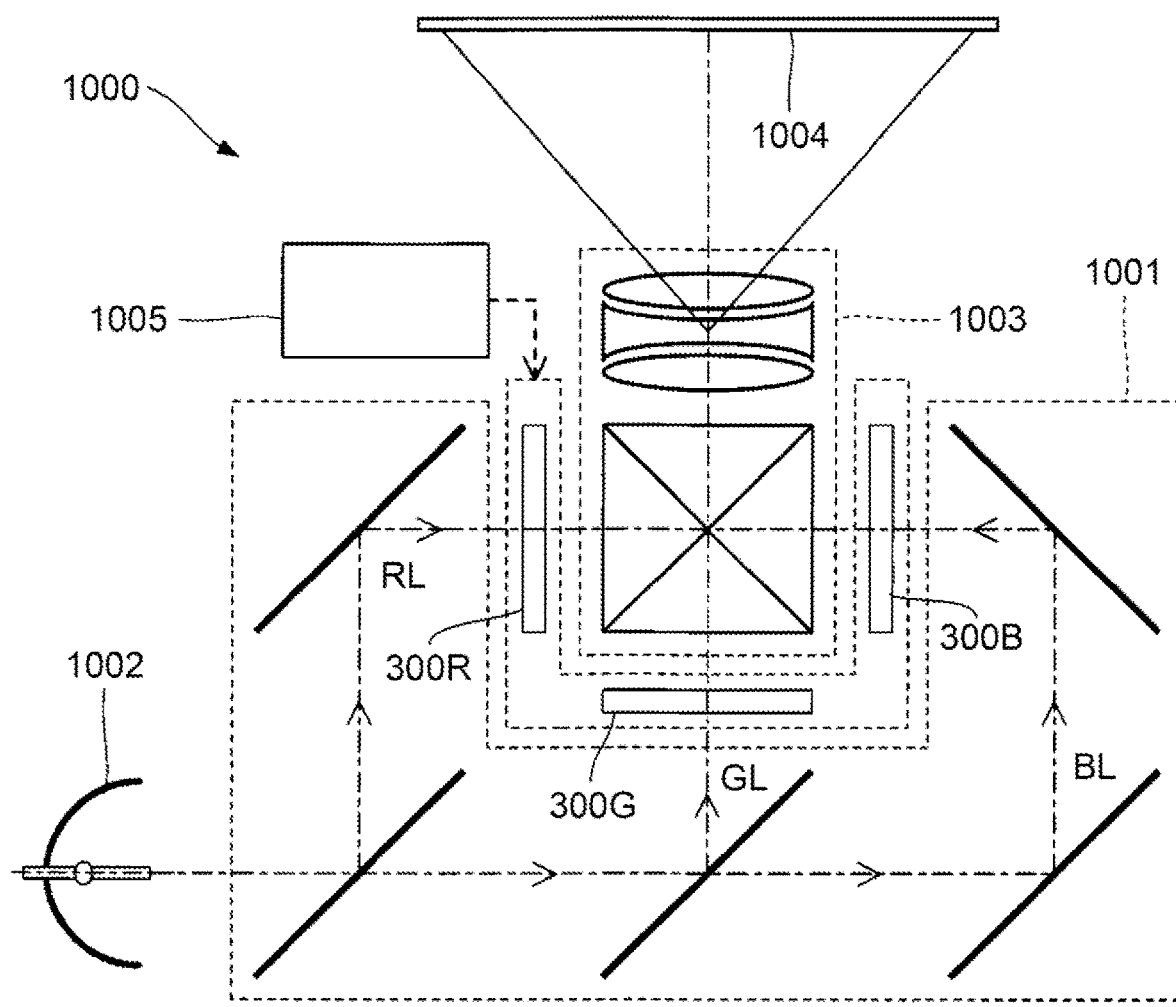
FIG. 24 is a schematic diagram illustrating an example of an electronic apparatus according to Embodiment 3.

FIG. 24 is a schematic diagram illustrating a projector as a projection-type display device, which is an example of an electronic apparatus.

A projector 1000 is, for example, a three plate type projector including the three liquid crystal devices 300 described above. A liquid crystal device 30CR corresponds to a red display color, a liquid crystal device 300G corresponds to a green display color, and a liquid crystal device 300B corresponds to a blue display color. A control unit 1005 includes, for example, a processor and a memory, and controls operations of the liquid crystal devices 300R, 300G, and 300B.

An illumination optical system 1001 supplies a red element RL of light emitted from an illumination device 1002 as a light source to the liquid crystal device 300R, a green element GL of the light to the liquid crystal device 300G, and a blue element BL of the light to the liquid crystal device 300B. The liquid crystal devices 300R, 300G, and 300B function as light modulation devices that modulate color light RL, GL, and BL supplied from the illumination optical system 1001 according to a display image, respectively.

A projection optical system 1003 combines emission light from each of the liquid crystal devices 300R, 300G, and 300B and projects the combined light onto a projector screen 1004.

As described above, the projector 1000 as the electronic apparatus according to the embodiment includes the liquid crystal device 300 described above.

Therefore, it is possible to improve performance of the projector 1000 by adopting the liquid crystal device 300 having high optical performance and high electrical reliability.

The electronic apparatus is not limited to the illustrated three plate type projector 1000. For example, the projector may be a single plate type projector, a double plate type projector, or a projector including four or more liquid crystal devices 300. Further, the electronic apparatus may be personal digital assistants (PDA), digital still cameras, televisions, video cameras, car navigation apparatuses, in-vehicle displays, electronic organizers, electronic paper, calculators, word processors, workstations, videophones, point-of-sale (POS), printers, scanners, copiers, video players, or equipment including a touch panel.

Although preferred embodiments have been described above, the present disclosure is not limited to the above-described embodiments. In addition, the configuration of each component of the present disclosure may be replaced with any configuration that exerts the equivalent functions of the above-described embodiments, and to which any configuration may be added.

What is claimed is:

1. An electro-optical device, comprising:
a transistor;
a pixel electrode provided corresponding to the transistor;
a lens layer provided at a layer between the transistor and the pixel electrode;
a first light transmitting layer provided at a layer between the lens layer and the pixel electrode, and planarized together with the lens layer;
a first conductive layer provided at a layer between the transistor and the lens layer; and
a second conductive layer provided at a layer between the first light transmitting layer and the pixel electrode, and electrically connected to the first conductive layer via a first contact hole.

2. The electro-optical device according to claim 1, wherein
the lens layer includes a flat portion on the pixel electrode side and a lens curved surface portion surrounding the flat portion.

3. The electro-optical device according to claim 1, wherein
the lens layer includes a lens surface protruding toward the pixel electrode.

4. The electro-optical device according to claim 1, comprising a second light transmitting layer including a second contact hole for electrically connecting the second conductive layer and the pixel electrode, wherein
the first contact hole and the second contact hole are provided so as not to overlap each other in plan view.

5. The electro-optical device according to claim 4, comprising a third light transmitting layer including a third contact hole for electrically connecting the first conductive layer and the transistor, wherein
the third contact hole and the first contact hole are provided so as to overlap each other in plan view.

6. The electro-optical device according to claim 5, wherein
a connecting member is included in each of the first contact hole, the second contact hole and the third contact hole.

7. An electronic apparatus comprising the electro-optical device according to claim 1.

8. An electro-optical device, comprising:
a transistor;
a pixel electrode provided corresponding to the transistor;
a lens layer provided at a layer between the transistor and the pixel electrode;
a first light transmitting layer provided at a layer between the lens layer and the pixel electrode, and provided between adjacent lens curved surfaces of the lens layer in plan view;
a first conductive layer provided at a layer between the transistor and the lens layer; and
a second conductive layer provided at a layer between the first light transmitting layer and the pixel electrode, and electrically connected to the first conductive layer via a first contact hole.

9. The electro-optical device according to claim 8, wherein
the second conductive layer is provided between adjacent lens curved surfaces of the lens layer in plan view.

10. The electro-optical device according to claim 8, wherein
the lens layer includes a lens surface protruding toward the pixel electrode.

11. The electro-optical device according to claim 10, wherein
a center of the lens surface of the lens layer is located closer to the pixel electrode than a surface of the first light transmitting layer on the pixel electrode side.

12. The electro-optical device according to claim 8, comprising a second light transmitting layer including a second contact hole for electrically connecting the second conductive layer and the pixel electrode, wherein
the first contact hole and the second contact hole are provided so as not to overlap each other in plan view.

13. The electro-optical device according to claim 12, comprising a third light transmitting layer including a third contact hole for electrically connecting the first conductive layer and the transistor, wherein
the third contact hole and the first contact hole are provided so as to overlap each other in plan view.

14. The electro-optical device according to claim 13, wherein a connecting member is included in each of the first contact hole, the second contact hole and the third contact hole.

\* \* \* \* \*